US012712714B2

(12) United States Patent
Sangle-Ferriere

(10) Patent No.: US 12,712,714 B2
(45) Date of Patent: Aug. 18, 2026

(54) TRANSMISSION OF A MESSAGE BY QUANTUM COMMUNICATION WITH EAVESDROPPING DETECTION

(71) Applicant: MARBEUF CONSEIL ET RECHERCHE, Paris (FR)

(72) Inventor: Bruno Sangle-Ferriere, Paris (FR)

(73) Assignee: MARBEUF CONSEIL ET RECHERCHE, Paris (FR)

( * ) Notice: Subject to any disclaimer, the term of this patent is extended or adjusted under 35 U.S.C. 154(b) by 98 days.

(21) Appl. No.: 18/422,527

(22) Filed: Jan. 25, 2024

(65) Prior Publication Data

US 2025/0080335 A1 Mar. 6, 2025

(30) Foreign Application Priority Data

Jan. 26, 2023 (FR) ....................................... 2300741

(51) Int. Cl.
*H04L 9/08* (2006.01)

(52) U.S. Cl.
CPC .......... *H04L 9/0852* (2013.01); *H04L 9/0869* (2013.01)

(58) Field of Classification Search
None
See application file for complete search history.

(56) References Cited

U.S. PATENT DOCUMENTS 11,469,889 B1 * 10/2022 Balmakhtar .......... H04L 9/0852
2013/0083926 A1 * 4/2013 Hughes ................. H04L 9/3247 380/278
2018/0191496 A1 * 7/2018 Duplinskiy ........... H04L 9/0852
2022/0408248 A1 * 12/2022 Balmakhtar .......... H04W 12/06

FOREIGN PATENT DOCUMENTS

CN 101547184 9/2009
EP 1421548 5/2004
KR 101003886 4/2008

OTHER PUBLICATIONS

International Search Report dated Sep. 13, 2023.
Hao Qin National University of Singapore Singapore: "Draft D2.3 Technical Report on quantum key distribution network (QKDN) protocols part 1: Quantum layer (output of 9th FG-QIT4N meeting);QIT4N-O-102", ITU-T Draft; Study Period 2021-2024; (Aug. 17, 2021).

* cited by examiner

*Primary Examiner* — Trang T Doan
(74) *Attorney, Agent, or Firm* — IPSILON USA, LLP

(57) ABSTRACT

A quantum communication system (1) has an emitter (2) of entangled photons, having a source configured in order to generate at least one pair of entangled photons comprising a first photon (P1) emitted on a first propagation path (D1) and simultaneously a second photon (P2) emitted on a second propagation path (D2) different to the first propagation path; and a first receiver (3) arranged on the first propagation path (D1), having a complex absorber (31) configured in order to absorb the photon in a polarization state selected from among the states of at least two different pairs of complementary polarization states. A second receiver (4) is arranged on the second propagation path (D2), having an optical amplifier (40) making it possible to multiply the second photon (P2) while preserving its polarization and a measuring instrument (45) making it possible to measure the average polarization of the multiplied photons (P20).

37 Claims, 17 Drawing Sheets

Figure 1A:
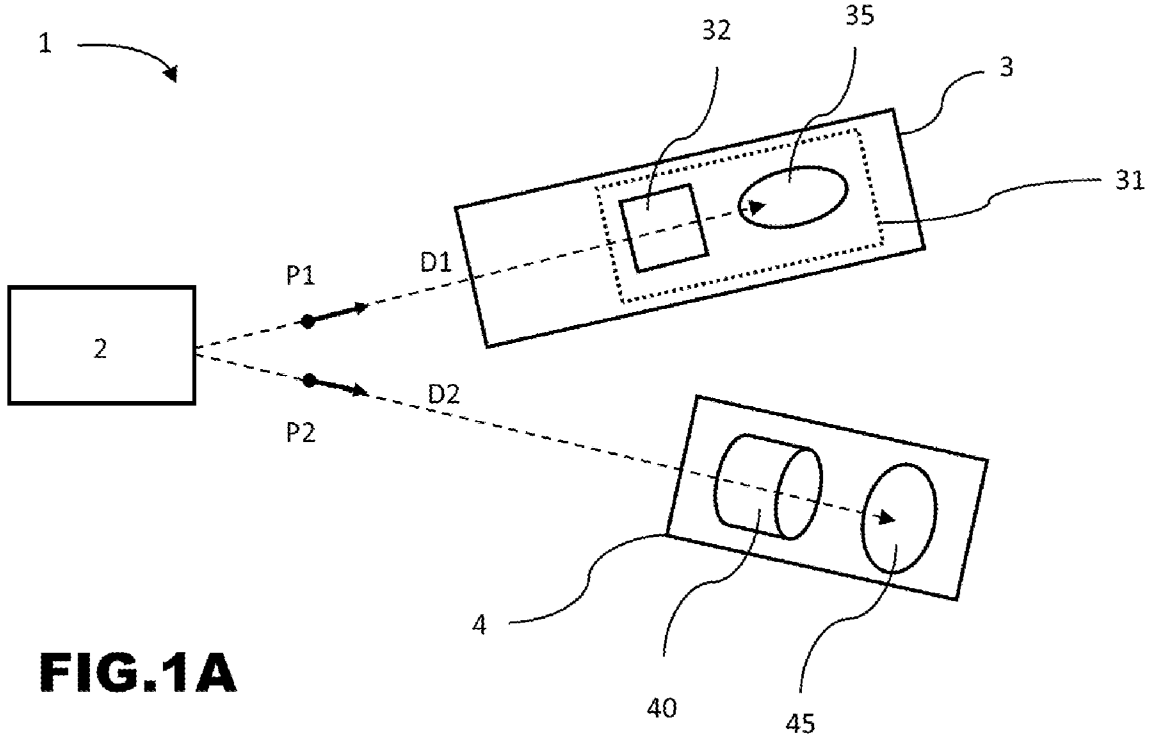

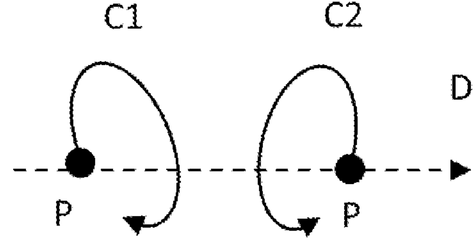
FIG.2B
FIG.3
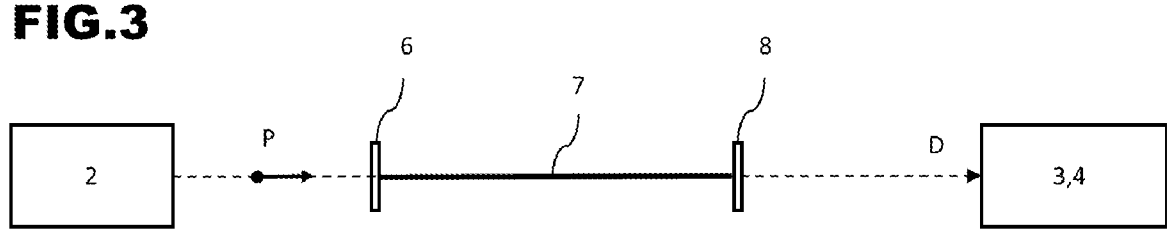

30

P1
D1
315
320
370
D3
325
D1'
35

30

330
345
325
D3
P1
F
35
D1'
335
340

523
521
511
560
520
558
522

528
- +
526
540
528
528
527
529
527

32b 310
322
321
310
E
E2
E'
P1
P1
E1
322

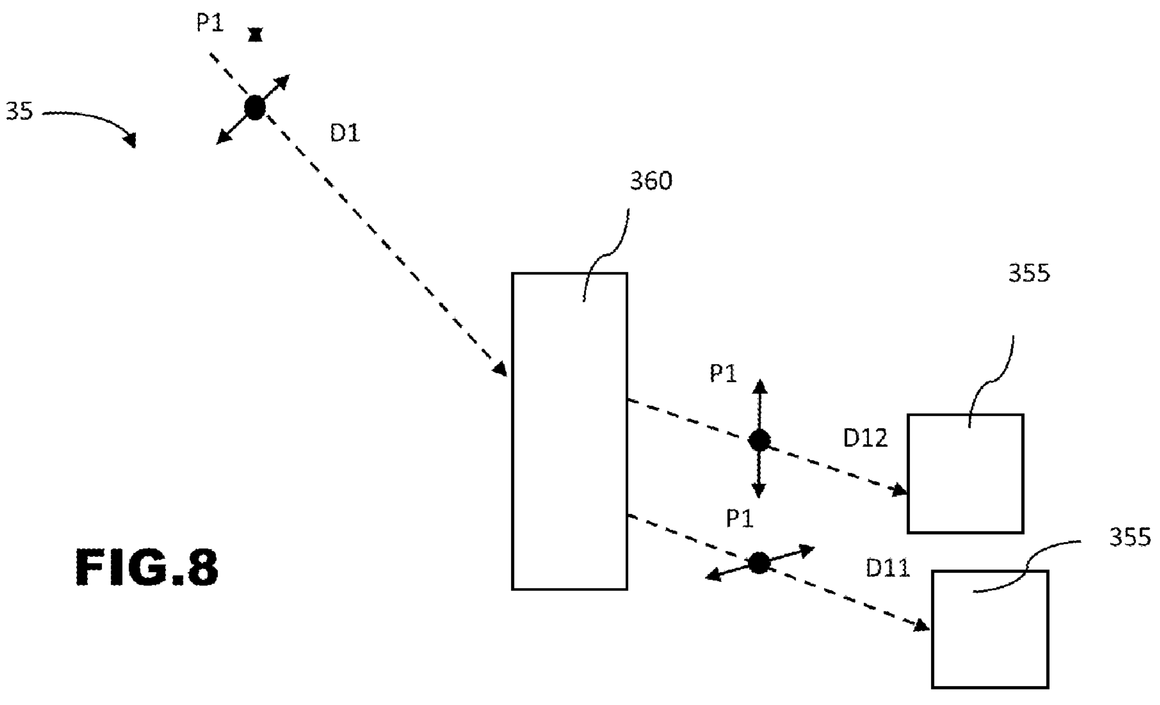
FIG.8
FIG.9
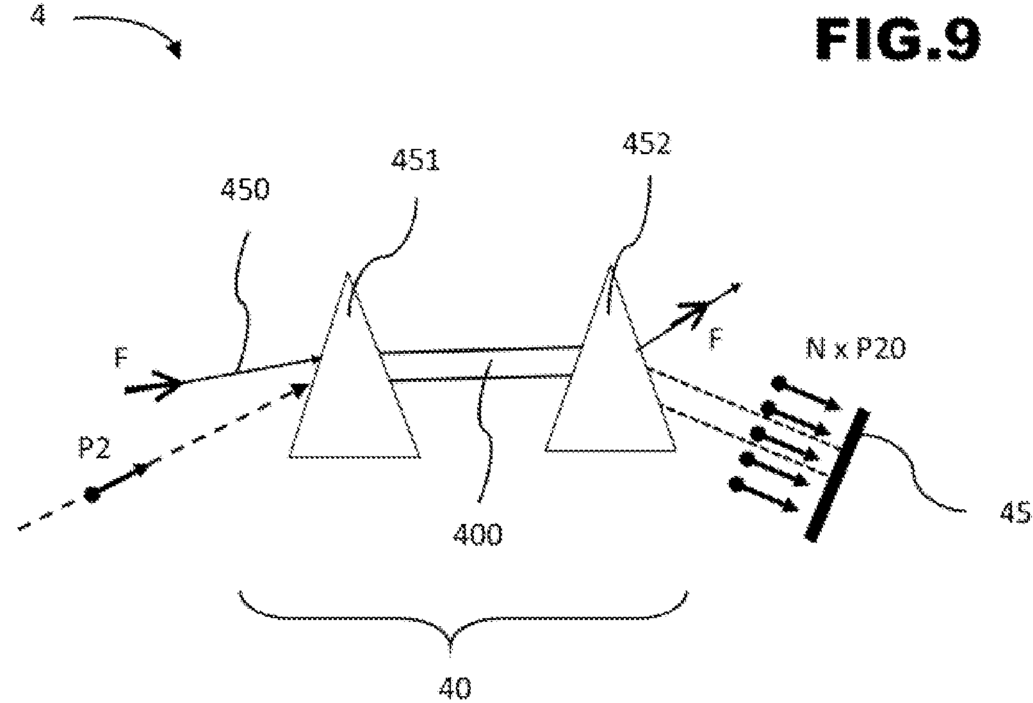

TRANSMISSION OF A MESSAGE BY QUANTUM COMMUNICATION WITH EAVESDROPPING DETECTION

DOMAINE TECHNIQUE

The present invention relates to methods of transmitting a message by quantum communication with eavesdropping detection, and more particularly to methods of transmitting a message by quantum communication using entangled photons with eavesdropping detection using cryptography.

TECHNIQUE ANTẼRIEURE

Cryptography

Computers and electronic apparatuses are often connected to a network, physically, wirelessly, by RFID, or by any other secure or unsecure means, and sometimes need to know the identity of the apparatus that has sent them certain data, for example in order to ensure that these data have not been transmitted by another apparatus, which intercepted them and modified them before sending them on to the legitimate recipient, or quite simply to identify beyond a shadow of a doubt the identity of the sender of the data, which is for example an automobile on a road network or an RFID tag worn by a competitor during a sporting event, or a list of bits randomly generated by a Quantum Key generation Device (QKD), or for any other reason why the identity of the sender of the data is important to the recipient.

Quantum Key generation devices often use electronic signatures exchanged between two remote parties receiving a randomly generated key to make sure that the received key is the same for each party. However, progress in quantum computing and/or cryptography may make it possible to retrieve the keys used for the electronic signing of received keys thereby allowing the supposedly secret key to be shared between a legitimate and a non-legitimate device without the legitimate device noticing it.

The transmitted data may be sent entirely encrypted with a key attributed to the sender. However, the encryption of all of the data makes the use of single-use keys (one-time pads) difficult. Specifically, the encryption of all of the data is a method that uses keys that are as long as the data that they encrypt, and these keys must be renewed after use.

It is therefore necessary for computers or other electronic devices entering into communication, for example via the exchange of text, identifiers, numbers, computer programs, images or video or audio codes, to verify the identity of the sending device using the encryption of an amount of data smaller than the amount of data sent. It is for this reason that an electronic signature consisting in encrypting a hash of the data is used. The term "hash" is used to refer to the result of a hash function that, on the basis of an initial datum provided as input, computes a fingerprint that serves to rapidly, though incompletely, identify the initial datum. It is common to send, with the data, an encrypted hash that will then be decrypted by the recipient, then compared to the hash of the received data. MD5, SHA1 and SHA256 are algorithms conventionally used for such hashing operations. However, data hashes are generally much smaller in size than the original data, and it may be possible to create other data, similar but slightly different to the original data, having a hash equal to the hash of the original data. These data could therefore be substituted for the original data, without being rejected by the procedure for verifying the hash. Any type of data may be substituted, but the detectability by the user of the substitution decreases as the complexity of the data increases (a long text, an audio file, a photo or a video). To make the substitution, it is not even necessary to decrypt the encrypted hash. It is enough to simply compute the hash of the original data. Furthermore, hash functions such as MD5 and SHA1 are hash functions that are at the present time relatively easy to bypass.

The quantum computers that are in the process of being developed should soon be capable of bypassing the security provided by hash functions, since they are capable of optimizing the start files so that they have a preset hash.

Methods for improving the security of systems using hashing techniques are known in the prior art.

Patent application CN101547184 uses a plurality of auxiliary authentication values that are exchanged between a server and users.

In the method proposed in patent application US2011/0246433, a hash of the data to be sent is generated and concatenated with the data chunk to be sent and a random number tag.

Patent application EP 1 421 548 describes a method for transmitting information, in which a message to be sent is concatenated with a random number then hashed. The result of the hashing is sent unencrypted to the other party. The message is sometimes transmitted as such or encrypted. The random number is always transmitted signed, and optionally encrypted, to the other party. The fact of not encrypting the hash when the message is itself not encrypted makes the transmission vulnerable to very powerful or quantum computers that are able to compute random numbers compatible with the unencrypted message and the result of the hash. Moreover, encrypting the entire message has the drawback, if such an encryption uses one-time pads, which are supposed to be uncrackable, of requiring both the two corresponding parties to have access to such shared keys.

Quantum Communication

The transmission of information is currently carried out essentially using electromagnetic waves, whether they have short wavelengths, such as light, or long wavelengths, such as VHF waves.

The transmitted waves may be guided by metal cables or by optical fibers, or they may be transmitted through space.

These methods use propagation of the waves in order to transmit energy and therefore physical particles which, collected by a receiver, make it possible to deduce items of information, these being encoded for example by their wavelength or by modulation of the duration of the wave trains.

Recently, so-called "quantum" communication methods have been developed.

For example, the physical state of a photon, such as its polarization, may be used in order to transmit information, for example via an optical fiber. The value of a bit is assigned arbitrarily to a direction, or a polarization mode, of the photon. Sequences of polarized photons may then be sent in order to transmit binary sequences forming a message.

In the scope of quantum cryptography, it is in particular known to use a pair of entangled photons in order to transmit information securely. Entangled photons are photons whose quantum states, for example their polarization, depend on one another regardless of the distance between them.

This phenomenon of quantum entanglement has been observed and demonstrated experimentally a number of times, for example in the article by Shasi Prabkhar et al. "Two-photon quantum interference and entanglement at 2.1 μm" (Sci Adv, 2020)

Patent KR101003886B1 describes a system for transmitting encrypted information, in which entangled photons are emitted simultaneously and are each sent toward two targets positioned at different locations wishing to communicate with one another. The photons received by the two targets form entangled random sequences of conjugate bits, these sequences being used as cryptographic encryption keys. This system makes it possible to receive the same sequence of random numbers almost instantaneously at two different locations, but does not make it possible to transmit information.

The article by Wang "Superluminal telecommunication: an observable contradiction between quantum entanglement and relativistic causality" discloses a quantum communication system making it possible to transmit information superluminally by using a pair of entangled photons sent toward two receivers wishing to communicate with one another. The photons are entangled, and a linear polarization is measured for the photon arriving at the first receiver along different directions at 45° to one another. At the second receiver, the second photon is multiplied and the average polarization of the multiplied flux is measured in order to determine the direction along which the first photon was measured.

The polarization of a photon is not however necessarily binary, like that of a spin is, or even quaternary. It may in particular be represented on the Jones sphere which characterizes the orientation and the ellipse of the polarization: specifically, a polarization may be linear, the electric field always being parallel to an axis perpendicular to the propagation direction of the photon, or circular, the electric field rotating around this axis, or somewhere between the two: the electric field describing an ellipse around the propagation axis. In the case in which the polarization is not circular, the orientation measures the direction of this axis, and the eccentricity measures the flattening of the ellipse.

The aforementioned devices do not make it possible to exploit all the configurations of the polarization, and they are de facto limited in the number and type of items of information which it is possible to transmit.

Expose de l'invention

There is a need to further improve quantum communication systems and methods, to take advantage of entangled photons and to prevent and detect eavesdropping while communicating with entangled photons.

Résumé de l'invention

The invention aims to meet this need and achieves it, according to a first one of its aspects, with a method of transmitting a message M by quantum communication from a first receiver to a second receiver with eavesdropping detection, the transmission and detection method comprising:

(A) generating a series of $N_p$ pairs of entangled photons from an emitter, the first photon of each pair being emitted toward the first receiver on a first propagation path and the second photon of the pair being emitted simultaneously toward the second receiver on a second propagation path, the first and second photons being entangled, the second receiver being located on the propagation path of the second photon further away from the emitter than the first receiver, such that the second photon arrives at the second receiver after an additional travel time $t_{tra}$, (B) converting the message M into a series of $N_i$ information I to be transmitted in a first predetermined numbering base, (C) at the first receiver, for each information I:

(a) for each entangled photon, modifying the polarization state of the first photon when it reaches the first receiver into a polarization state dependent on the information I to be transmitted, the polarization state being selected from among at least two different pairs of complementary absorption polarizations, and (b) by using an absorption instrument, absorbing the first photon in one of the two complementary polarizations of the selected pair, (D) at the second receiver:

(a) duplicating each received photon to form a flux of multiplied photons by using an amplification device, the light that is created having preserved the polarization state of the photon, (b) measuring, for each photon duplicated, the average polarization state of the light flux, and (c) determining according to this measurement the polarization state of the first entangled photon received by the first receiver, in order to deduce therefrom the information I that may have been transmitted by the first receiver, (d) add an element comprising the reception time of the second entangled photon and the determined polarization state of the first entangled photon that may have transmitted the information I, to a deduction list, the deduction list being a list comprising the reception times of the second entangled photons and the determined polarization states of the first entangled photons that may have transmitted the information I, (E) perform an eavesdropping detection method, (F) deduct from the deduction list the transmitted message M, the eavesdropping detection method performed at step (E) comprising a shared quantum key generation method comprising:

(G) the first receiver establishing a first list comprising the reception dates at the first receiver and a second list comprising these reception dates and the relative polarization states of the photons absorbed by the first receiver, and the second receiver establishing a third list comprising the reception dates at the second receiver and a fourth list comprising these reception dates and the relative polarization states of the photons received by the second receiver, (H) the first list and/or the third list being exchanged between the first receiver and the second receiver, (I) upon reception of the third list and/or first list, respectively, the first receiver and/or the second receiver establishing a fifth list comprising the dates at which the first photons were received at the first receiver, for the pairs for which the two entangled photons were received at both receivers, as some photons may have been lost during the transmission between the emitter and one or the two receivers, (J) if only one of the two receivers establishes the fifth list, the said fifth list being transmitted, preferably electronically signed, to the other receiver, so that the first receiver and the second receiver establish respectively a sixth list and a seventh list of relative polarization states of the photons as received by the first receiver, the sixth list being derived from the second list and the fifth list, the seventh list being derived from the fourth list and the fifth list, each relative polarization state on the sixth list of a photon received at the first receiver at a time marked on the fifth list being the same relative polarization state of the corresponding photon received at the same time and marked on the second list, each relative polarization state on the seventh list of a photon entangled to a photon received at the second receiver at a time marked on the fifth list being the complementary relative polarization state of the polarization state of the corresponding photon received at the second receiver after the additional travel time $t_{tra}$ and marked on the fourth list, (K) respective signatures of the sixth list and the seventh list being exchanged between the first and the second receivers to be compared according to a comparison method, (L) if the signatures of the sixth list and the seventh list are identical, the deduction list of information I is considered non-eavesdropped.

The relative polarization of a photon may be the polarization of the photon.

Preferably, the relative polarization of a photon is a bit assigned to all the possible polarizations that can be taken by the second entangled photon after the first photon has hit the first receiver, where 1 is the said assigned bit of a photon entangled to a photon to which a 0 has been assigned.

The Comparison Method in Step (K) May Comprise:

i. the first receiver mixing a first secret number, shared or to be shared with the second receiver, called mixer number, with the sixth list, using a mixing function, in order to obtain a first mixed data, ii. the first receiver hashing the first mixed data using a hash function, iii. the first receiver encrypting the hashing of the first mixed data with a second secret number shared or to be shared with the second receiver, iv. the first receiver sending to the second receiver, the encrypted hashing of the first mixed data with the second secret number, v. the second receiver receiving the data sent by the first receiver at step iv, vi. the second receiver decrypting the received data, vii. the second receiver mixing the first secret number with the seventh list, using a mixing function, in order to obtain a second mixed data, viii. the second receiver hashing the second mixed data using a hash function, ix. the second receiver comparing the hashing of the second mixed data with the decrypted received data.

The first secret number may be kept secret and used again. The first secret number may preferably be changed periodically such as each time or every day.

The second secret number may be kept secret and used again or, it may preferably be changed periodically such as each time or every day.

The first secret number may be a first renewable key, for example renewed after each use and/or the second secret number may be a second renewable key, for example renewed after each use.

Preferably the first secret number is kept secret and used again, and the second secret number is a onetime key renewed after each use.

The transmission and detection method preferably is not implemented if either the first or second key is not secret anymore.

The receivers may share the secret numbers between each other before step (K) takes place. Alternatively, the secret numbers may be exchanged between the two receivers after step (K). The receivers may share the secret number by sending it to each other encrypted with a onetime key.

A mixer number identifier may be exchanged between the first and the second receiver, which are each able to find the corresponding mixer number in a memorized list of mixer numbers.

The mixing function may be an XOR logic function, or a suffix function, consisting in adding the mixer number to the end of the sixth list, or an encrypting function using the mixer number as encryption key to encrypt the sixth list.

The mixing function may alternatively be a combination of an XOR function, a suffix function consisting in adding the mixer number to the end of the first dataset and an encryption function using the mixer number as encryption key to encrypt the first dataset.

The encrypting function may be an XOR function.

A signed message may be exchanged after step ix. between the two receivers before the sixth and seventh lists are used as one-time keys.

The deduction list of information I may be considered as not having been eavesdropped if the two compared data at step ix. are equal.

The lists established at step (G) may be established for the transmission of a single information I. Alternatively, the lists established at step (G) may be established using photons transmitted for the transmission of a series of multiple information I.

The second propagation path is preferably physically protected against eavesdropping, at least for a portion of the second propagation path ending at the second receiver, where the photons travel from the emitter after their entangled photon has been received by the first receiver. This may avoid a hacking device placed at such non protected portion of the propagation path to eavesdrop and retransmit the photons traveling there not entangled anymore. The portion is preferably long enough so that the difference between the travel time of a photon in the said portion and the travel time of the photon in the non-entangled state towards the second receiver may be detected by the second receiver and that such detection enables the second receiver to mark any incoming message as being potentially eavesdropped by a third party.

Two polarization rotators are preferably placed ahead of the two photon receivers respectively, the two photon rotators modifying the direction of polarization of the photons synchronously and randomly, for example by 45° or 0°, for example every photon or every second, so that a spy photon emitter may not know the polarization directions that are being measured by the receivers. The two receivers may share a list of random bits where 0 represents a rotation by 0° and 1 a rotation by 45°.

This may avoid a known secret number being generated by a hacker replacing the entangled photons emitter by a photon emitter sending non entangled photon pairs representing a message that is also made to be sent by the first receiver.

The sixth list and seventh list may be made of bits, and potentially may be used as a shared list of random bits.

The transmitted message M may be used as an encryption key if the deduction list has been considered as not having been eavesdropped.

The encryption keys generated during the transmission and detection method and/or made of the message M, may be used, if the deduction list has been considered non-eavesdropped, as first and/or second secret numbers.

The first receiver may code the same information I on many successive incoming photons, as some of their entangled photons may be lost before reaching the second receiver.

The first receiver may reserve an information $I_0$ to be used to separate the sending of any other two information, notably if the such two other information are the same, representing for instance a same letter.

The step (F) consisting in deducting from the deduction list the transmitted message M may be achieved by the first receiver having coded a separation letter between any two equal successive letters of the message M, accounting for the travel time $t_{tra}$ and the fifth list, taking out of the deduction list the polarizations of photons for which the first entangled photon never reached the first receiver to create a cleared deduction list, and the second receiver deducting from the cleared deduction list the message M that was transmitted.

Alternatively, the second receiver may count as received information any information that is recorded successively on the deduction list more than a preset number of times within a preset number of successively received information I. For instance, if there are 450 different polarization states pairs that can be encoded on the photons and the propagation paths lose 90% of the photons between the emitter and the receivers, the second receiver may count as a received information any information that appears at least 6 times within 200 received photons, or any information that appears at least 6 times within 200 successive records of the deduction list.

The message M may be considered as not having been eavesdropped if the deduction list has been considered as not having been eavesdropped.

The pair of complementary absorption polarizations may be selected from among at least three different pairs of complementary absorption polarizations.

The pair of complementary absorption polarizations may be selected from among at least 210 distinct pairs of complementary absorption polarizations.

A plurality of pairs of entangled photons may be generated successively by the emitter, each pair of photons making it possible to transmit an item of information from the first receiver to the second receiver.

First Quantum Communication System

According to another of its aspects, the invention relates to a first quantum communication system implementing the method described above, comprising:

- an emitter of entangled photons, comprising a source configured in order to generate at least one pair of entangled photons comprising a first photon emitted on a first propagation path and simultaneously a second photon emitted on a second propagation path different from the first propagation path,
- a first receiver arranged on the first propagation path, comprising a complex absorber configured in order to absorb the photon in a polarization state selected from among the states of at least two different pairs of complementary polarization states,
- a second receiver arranged on the second propagation path so as to be reached by the second photon after the first photon has reached the first receiver, said second receiver comprising:
  - an optical amplifier to multiply the second photon while preserving its polarization, and
  - arranged downstream of the amplifier, a measuring instrument to measure the average polarization of the multiplied photons.

The complex absorber may be configured to absorb the photon in a predetermined polarization state selected from among the states of at least three different pairs of complementary polarizations.

The Complex Absorber May Comprise:

- at least one instrument to absorb the photon in one or other of two complementary polarization states,
- a polarization modifier which is arranged upstream of said instrument and is configured in order to convert the polarization of the first photon to the selected polarization along which said instrument absorbs the photons.

The polarization modifier may comprise a polarization direction modifier arranged upstream of a polarization phase modifier.

The polarization direction modifier may comprise two quarter-wave plates arranged one after the other on the propagation path of the first photon, the orientation of at least one of the two plates being variable.

The polarization direction modifier may comprise a plate or a prism made of chiral or rotating material inducing rotation of the polarization by an angle dependent on the location through which the wave enters said chiral or rotating material.

The polarization phase modifier may comprise a birefringent first plate or prism splitting the beam into two electromagnetic waves with a linear polarization, one along a first axis and the other along a second axis, and a retardation plate with a variable refractive index arranged on the second axis.

Said at least one instrument may comprise at least one filter to send the first photon toward one or other of two photon detectors according to the polarization state of the first photon.

The measuring instrument of the second receiver may comprise at least one photon detector arranged in order to measure the polarization of the light originating from the multiplication of the second photon.

The measuring instrument of the second receiver may comprise a succession of semi reflective plates arranged downstream of the optical amplifier, said plates directing the flux of multiplied photons with an equal intensity toward a first phase measurement instrument being a polarization measuring instruments arranged in order to measure the intensity of the flux along two perpendicular axes, a second phase measurement instrument measuring the phase shift of the light between these two same axes and a third phase measurement instrument measuring the phase shift of the light between the bisector of the same axes and an axis perpendicular to that bisector.

The first semi reflective plate may divert a third of the light flux towards the first phase measurement instrument, the second semi-reflective plate may divert half of its incoming light flux towards the second phase measurement instrument and the remaining half of its incoming light flux towards the third phase measurement instrument.

The optical amplifier may be a doped-fiber amplifier.

The emitter may be configured to successively generate a plurality of pairs of entangled photons.

The emitter and each of the receivers may comprise a clock, the clocks of the emitter and of the receivers being synchronized with one another.

The second receiver may comprise a switch arranged in front of the optical amplifier and configured to absorb or reflect the photon or photons subsequent to a first photon reaching said second receiver in a predetermined time interval.

The first quantum communication system may comprise a second emitter capable of generating one or more pairs of entangled photons, the second emitter being located closer to the second receiver than to the first receiver.

Second Quantum Communication System

The invention further relates to a second variant of a quantum communication system according to the invention, comprising:

- an emitter of entangled photons, comprising a source configured in order to generate at least one pair of entangled photons comprising a first photon emitted on a first propagation path and simultaneously a second photon emitted on a second propagation path different to the first propagation path;
- a first receiver arranged on the first propagation path, comprising a complex absorber configured in order to absorb the photon in a polarization state selected from among the states of at least two different pairs of complementary polarization states, with the exception of exactly two pairs of perpendicular linear polarizations in which the polarizations of one of the pairs are at 45° to the polarization directions of the other pair;
- a second receiver arranged on the second propagation path so as to be reached by the second photon after the first photon has reached the first receiver, said second receiver comprising:
  - an optical amplifier making it possible to multiply the second photon while preserving its polarization, and
  - arranged downstream of the amplifier, a measuring instrument making it possible to measure the average polarization of the multiplied photons.

The second variant of the system according to the invention is arranged in order to transmit a series of continuous or discrete values quasi-instantaneously between two places.

Since the first and second photons are entangled, the absorption of the first photon at the first receiver instantaneously determines the polarization of the second photon, in particular before it reaches the second receiver.

Measuring the average polarization of multiplied photons at the second receiver then makes it possible to detect the polarization state in which the first photon was absorbed, and to deduce the transmitted information therefrom.

This second variant of the system consequently makes it possible to transmit information without a latency time, regardless of the distance between the two places wishing to communicate, and by using only photons, which requires little energy.

The second variant of the system is, for example, used for communication networks and computer networks on the Earth, in the sky and/or in space, particularly in order to communicate with systems far away from the Earth, such as satellites or spacecraft.

Jones Polarizations

The term "complementary polarization states", also referred to below as "complementary absorption polarization states" is intended to mean two polarization states of light for which the modification of the polarization of said light by linear optical elements, in particular mirrors, birefringent plates and/or prisms, including quarter-wave plates, for one of them allows its absorption by a first polarizing filter and for the other its absorption by a second filter polarizing along a polarization orthogonal to that along which the first filter can absorb.

In what follows, the terms "polarization state" and "polarization" are used interchangeably.

The first receiver is advantageously arranged so that its user can select the polarization state in which the photon is absorbed from among any one of the possible polarizations as defined by the Jones formalism, in particular from among a set of elliptical (also referred to as "ellipsoidal") polarizations characterized by the orientation and the ellipse of the polarization.

The polarization along which the photons are absorbed by the first receiver may thus be varied in order to transmit a series of items of information to the second receiver.

For example, by selecting 10 different polarization directions, for example spaced apart by 9° from one another, and 21 different phase shifts, also spaced apart by 9° from one another, 210 different polarization states may be defined and 210 different signals may thus be transmitted.

For example, letters of the alphabet in upper or lower case, numbers and a certain number of other special characters may be transmitted for each of the pairs of entangled photons reaching the receivers.

Complex Absorber

The term "complex absorber" describes an assembly which is reached by the first photon and makes it possible to determine a pair of complementary polarizations from among a certain number of pairs of complementary polarizations, and to absorb the first photon in one of the two polarization states of the predetermined pair.

Preferably, the complex absorber of the first receiver is configured in order to absorb the photon in one state of a predetermined pair of complementary polarizations, which is selected from among the states of at least three different pairs of complementary polarizations, and preferably from among a number of different pairs of complementary polarizations selected according to the number of different values to be transmitted, as described above.

Preferably, the Complex Absorber Comprises:

- at least one absorption instrument making it possible to absorb the photon in one or other of two states of a pair of complementary polarizations, for example two orthogonal linear polarizations.
- a polarization modifier which is arranged upstream of said absorption instrument and is configured in order to convert the polarization of the first photon to the selected polarization along which said absorption instrument absorbs the photons.

The term "selected polarization" is intended to mean a pair of complementary polarizations which is predetermined according to the information to be transmitted.

Polarization Modifier

The linear polarization of a photon may be converted into ellipsoidal polarization, as represented by the Jones formalism, firstly by modifying the orientation of the polarization of a photon with a linear polarization and a known direction, thus distributing the electric field in a predetermined way between an axis x and an axis y perpendicular to the axis x, then secondly by modifying the phase of the electric field along one of the two perpendicular directions, for example the axis y.

The polarization modifier preferably comprises a polarization direction modifier arranged upstream of a polarization phase modifier.

For example, if $\theta$ is the angle of rotation of the linear polarization and $\phi$ is the phase shift along the axis y, $\omega$ being the angular frequency of the wave, the electric field components $E_x$ and $E_y$ after the rotation are:

$$E_x = E\ \mathrm{Cos}\ (\theta)\ \mathrm{Cos}\ (\omega t)$$

$$E_y = E\ \mathrm{Sin}\ (\theta)\ \mathrm{Cos}\ (\omega t)$$

and after the phase shift:

$$E_x = E \text{ Cos}(\theta) \text{ Cos }(\omega t)$$

$$E_y = E \text{ Sin }(\theta) \text{ Cos }(\omega t + \phi)$$

Polarization Direction Modifier

A linear polarization direction may be modified in various ways, for example by a half-wave plate or alternatively by a double quarter-wave plate.

The polarization direction modifier may comprise two quarter-wave plates arranged one after the other on the propagation path of the first photon, the orientation of at least one of the two plates being variable.

The first quarter-wave plate modifies, for example, the linear polarization into circular polarization, and the second quarter-wave plate converts, for example, the circular polarization into a linear polarization whose direction is orientated along an axis that depends on the direction of the axis of the second quarter-wave plate.

A rotation of the axis of this second plate therefore makes it possible to modify the direction of the linear polarization of the photon. If the plate is a half-wave plate, rotation of this said half-wave plate makes it possible to modify the direction of the linear polarization of the photon.

Alternatively, the orientation of the first quarter-wave plate may be modified, that of the second being fixed, or the orientations of both quarter-wave plates may be modified.

The rotation of a quarter-wave plate or of a half-wave plate is obtained, for example, by mechanical slaving to a sensor or to an electrically regulated device making it possible to rotate it, for example by friction on an axle set in movement by a piezoelectric material or by an electric motor device, for example operating with direct current.

Alternatively, a plurality of devices for rotating the linear polarization may be used, each allowing different angles of rotation, which are for example fixed but may quite possibly be modifiable, selectors making it possible to send the photons to one of these rotation devices and, at the exit of said rotation device, to conduct said photon toward a common waveguide or to a common transmission axis.

These selectors may comprise a mirror, the direction of the axis of which is regulated for example by an electrical device, or alternatively they may consist of a prism or a plate made of a material whose refractive index depends on an electric field: a Pockels cell, or a transparent material having a nonlinear refractive index, or another light flux, for example transverse and preferably with a wavelength different to that of the photon and not capable of generating photons with a wavelength which is the same as that of the photon, which varies the refractive index of said nonlinear material and thus regulates the site and optionally the direction of the exit of the photon from said material. Since the rotational inertia of a quarter-wave plate may be high, the photons may be sent successively to different quarter-wave plates whose direction will have been adjusted beforehand, for example by one of the mechanical rotation devices described above, thus allowing time to modify the direction of each of these quarter-wave plates between two photon passes.

As a variant, chiral or rotating materials may be used in order to modify a linear polarization direction.

The polarization direction modifier may comprise a plate or a prism made of chiral or rotating material inducing rotation of the polarization by an angle dependent on the location through which the wave enters said chiral or rotating material. The material may, in particular, be arranged between two Pockels cells.

The first photon may be projected onto a first plate or a first prism forming a Pockels cell, the refractive index of which is controlled by an electric field in order for it to emerge therefrom at different locations, in particular onto an intermediate plate or prism made at least partly of chiral or rotating material that rotates the electrical polarization axis of the photon by an angle dependent on the location through which the wave enters said intermediate plate or prism, before entering a second plate or a second prism forming a Pockels cell, the refractive index of which is adjusted symmetrically with respect to that of the first plate or the first prism in order to make the photon emerge along the same direction as if the refractive indices of the first plate or prism and of the second plate or prism both had a fixed value. A third plate whose refractive index can also be adjusted, for example electrically, is advantageously placed after the second plate or prism in order to allow the location of the exit of the photon from the set of plates and prisms to be made independent of the refractive index selected for the first plate or prism.

The plate or prism made of intermediate material is, for example, composed of two contiguous symmetrical prisms which have the same refractive index but different chiral or rotating powers, the first of the two prisms having for example a chiral or rotating power and the second not having one, or alternatively rotating the electric field in the opposite sense to the rotation imposed by the first prism.

One of the two intermediate prisms may comprise a chiral material, for example nanoparticles of cadmium selenide (CdSe) with a diameter of about 1.4 to 2.4 nm, as described in the article by Visheratina, Anastasia, and Nicholas A. Kotov. "Inorganic nanostructures with strong chiroptical activity." (*CCS Chemistry* 2.3 (2020): 583-604); the other intermediate prism preferably not being chiral, or alternatively having a chirality opposite to that of said first intermediate prism. Since the rotation of the electric field of the waves passing through a chiral material is proportional to the thickness across said chiral material, the rotation of the electric field passing through the intermediate plate depends on the site through which it is entered by the light that passes through it.

One of the two intermediate prisms may furthermore comprise a "rotating" material, such as a superposition of an even number of quarter-wave plates stacked on one another in directions incremented by a predetermined angle at each layer, so that a wave polarized linearly along the axis of the first slice of the material emerges from the stack with a polarization rotated by an angle proportional to the thickness of the stack.

Polarization Phase Modifier

A second device, referred to as a "polarization phase modifier" may also be arranged downstream of the polarization direction modifier in order to phase-shift the component of the electric field of the photon by a predetermined angle along one of two fixed axes.

Preferably, the polarization phase modifier comprises a first birefringent plate or prism arranged in order to split the beam into two electromagnetic waves with a linear polarization, one along a first axis and the other along a second axis, and a retardation plate with a variable refractive index arranged on the second axis.

A "beam" is intended to mean a light wave which consists of the first photon in the sense of the duality of light.

The retardation plate causes the wave orientated along the second axis to acquire a predetermined phase shift with respect to the wave orientated along the first axis, before being mixed with it again by a new birefringent plate or prism making it possible to combine the two waves, the polarization fields of which are perpendicular, along the same axis.

The retardation plate may comprise a Pockels cell or a nonlinear material. The variable refractive index makes it possible to select the phase shift imposed on the wave orientated along the second axis.

In a first exemplary embodiment, as described above, the phase modifier rotates a linear polarization by angles spaced apart by 9° and varying between −45° and +36°, and varies the phase by angles spaced apart by 9° between −90° and +90°, thus defining 210 possible polarization states. As described below, 209 of the 210 possible polarizations are, for example, used in order to encode the data and the $210^{th}$ linear polarization is used in order to absorb any entangled photon received in a predetermined time after the reception of a photon that has been used to encode a datum.

In a second exemplary embodiment, the phase modifier rotates the polarization axis by 45° before the photon is absorbed, in order to transmit for example a 0, and converts the polarization of the photon into circular polarization in order to transmit for example a 1.

Reflection of the First Photon

The invention furthermore relates to a third variant of the quantum communication system according to the invention, comprising:

- an emitter of entangled photons, comprising a source configured in order to generate at least one pair of entangled photons comprising a first photon emitted on a first propagation path and simultaneously a second photon emitted on a second propagation path different to the first propagation path;
- a first receiver arranged on the first propagation path, comprising:
  - at least one first absorption instrument arranged in order to absorb the first photon in one of two states of a pair of complementary polarizations, the polarization being indeterminate in the observable basis according to which the first instrument absorbs the photons,
  - an optical selector arranged upstream of said at least one first instrument and configured in order either to allow the first photon to pass through toward said at least one first measuring instrument or to prevent it from being measured;
- a second receiver arranged on the second propagation path so as to be reached by the second photon after the first photon has reached the optical selector and/or after it has been able to reach the measuring instrument of the first receiver, said second receiver comprising an optical amplifier making it possible to multiply the second photon while preserving its polarization, and, arranged downstream of the amplifier, a measuring instrument making it possible to measure the average quantum state of the multiplied photons.

An "observable basis" refers to a basis of two complementary polarizations, for example two orthogonal linear polarizations.

The term "polarization indeterminate in an observable basis" refers to a photon whose polarization as observed in one of the two predetermined polarizations of an observable basis is not defined, that is to say it is random, for example equiprobable.

Since the first and second photons are entangled, the absorption of the first photon at the first receiver instantaneously determines the polarization of the second photon, in particular before the latter reaches the second receiver.

Measuring the polarization of the photons multiplied at the second receiver then makes it possible to detect whether or not the first photon has been absorbed, and to deduce therefrom the information which has been transmitted. The information transmitted by this third variant of the system is, for example, of the binary type.

The first receiver may comprise at least one second absorption instrument, the optical selector being arranged upstream of the first and second instruments and configured in order either to allow the first photon to pass through while directing it toward one or other of the instruments or to prevent it from being absorbed.

The use of two instruments makes it possible to transmit three different items of information, for example the values 0, 1 and 2, the value 0 being for example assigned to reflection, the value 1 to the first instrument, and the value 2 to the second instrument.

Optical Selector

The optical selector of the first receiver may be of a variety of types. It is advantageously placed upstream of the measuring instrument in order to be able to prevent the incident photon from reaching the measuring instrument, if this is desired.

For this purpose, the selector preferably comprises a reflector, in particular a controlled mirror, making it possible for example to reflect the first photon on a propagation path different to its incident propagation path, in particular on a propagation path not containing the measuring instrument.

A "controlled mirror" refers to a device of which some properties, for example the refraction properties or the reflection direction, are controlled by an auxiliary device connected to the mirror, in particular an electronic device, for example one which generates an electric field.

The optical selector preferably comprises a device whose refractive index and/or reflection direction are controlled, in particular controlled by using an electric field or a light flux.

Alternatively, the optical selector comprises for example a Bragg mirror, in particular a Bragg mirror whose reflection direction is regulated by a piezoelectric material, which is itself controlled by an electric field.

As a variant, the optical selector comprises a prism, in particular comprising Pockels cells whose refractive index is controlled by an electric field, the application of an electric field making it possible to direct the photon toward the or one of the measuring instruments or toward a Bragg mirror, which is advantageously inclined with respect to the incidence direction of the electromagnetic waves reaching it so that said waves are reflected toward a location preferably different to that from which they come at the entry of the prism. In another variant, the optical selector comprises one or a succession of Bragg filters, some layers of which are Pockels cells whose refractive index is controlled by an electric field, said Bragg filter reflecting the light wave or allowing it to pass through, according to whether or not the electric field is applied.

Alternatively, the Pockels cells used above may be replaced with nonlinear crystals illuminated by powerful light that can vary the refractive index of the medium through which the photon passes, the wavelength of the powerful light preferably being different to the wavelength of the photon.

The optical selector makes it possible in particular to orientate the photons in three different directions, one direction for example making it possible for the photons not to be detected, a second making it possible to measure a linear polarization of the photons and a third making it possible to measure a circular polarization.

Protection Device

Preferably, the quantum communication system according to the invention furthermore comprises a device for protecting the quantum state of at least one photon, in particular a device which prevents the measurement or absorption of at least one photon, which is arranged in proximity to the first receiver so as to make it possible to protect the quantum state of the first photon after its reflection, preventing it from being absorbed or measured by one or more measuring instruments, said quantum state of the first photon being protected at least until the second photon has been multiplied at the second receiver.

The device for protecting the quantum state is placed close to the first receiver so as to protect the quantum state of the first photon when the latter is reflected and/or deviated from its incident propagation path by the optical selector in order not to be observed there, that is to say when it is not desired for it to be absorbed by the measuring instrument of the first receiver.

Preferably, the device for protecting the quantum state comprises a transparent space, in particular a transparent space and at least one mirror. The transparent space may be empty or filled with a gas or liquid.

Preferably, it comprises a plurality of Bragg mirrors which are arranged with respect to the transparent space so as to trap the photon which it receives, on a path of suitable length as described above, that is to say corresponding to the time which it takes for the second photon that has reached the second receiver to be amplified there.

As a variant, the protection device comprises an optical fiber with a length making it possible for the first photon to circulate therein while waiting for the second photon that has reached the second receiver to be amplified there.

In another variant, the device may be a portion of space or atmosphere which is empty or filled with a gas, for which it is ensured that no object reflecting or absorbing light passes through it.

Instrument for Absorption of the First Photon

At the first receiver, the first photon may be absorbed by at least one absorption instrument in one of two states of a pair of complementary polarizations.

Preferably, the absorption instrument comprises at least one filter making it possible to send the first photon toward at least one photon detector, in particular toward one or other of two photon detectors according to the polarization state of the first photon, the filter preferably being a prism or a plate made of a birefringent material.

The absorption instrument may furthermore comprise a polarizing filter and a photon detector located after said polarizing filter.

The absorption instrument may furthermore comprise a semitransparent mirror that reflects the circularly polarized photons toward a first photon detector and allows the others to pass through toward a second photon detector, as described in the article by Mai, Wending, et al. "Broadband transparent chiral mirrors: Design methodology and bandwidth analysis." (*AIP Advances* 9.4 (2019): 045305).

Emission of the Photons

Photon Pair Emitter

Preferably, the emitter generates pairs of entangled photons by spontaneous parametric down-conversion (SPDC), that is to say according to a process in which an initial photon, also referred to as a "pump" photon, is divided in two and its frequency is halved by a four-wave mixing phenomenon in an optical medium with a nonlinear refractive index, as is described in the article by Amanti et al, "les sources intégrées de photons intriqués au coeur des technologies quantiques" [Integrated sources of entangled photons at the heart of quantum technologies](Photoniques, No. 91, 2018).

This type of photon pair emitter makes it possible to produce photons whose entanglement is comparatively robust, but has the disadvantage of sometimes producing more than one pair of photons at a time, which is undesirable because it is uncontrolled. Auxiliary devices may be implemented in order to deal with these "parasitic" multiple pairs, as is described below.

As a variant, an emitter comprising a quantum dot may be used in order to generate pairs of entangled photons, as described in the article cited above, which makes it possible to obtain pairs in a more regular way. The entanglement properties of the photons obtained with such a method may nevertheless sometimes be unstable.

Optical fibers made of a birefringent crystal may also be used, as described in the article by Smith et al "Photon pair generation in birefringent optical fibers" (Optics Express, Vol. 17, Issue 26, 2009).

Preferably, the emitter is configured in order to generate a plurality of pairs of entangled photons successively.

The entangled photons may be sent on first and second propagation paths at the exit of the emitter in various ways.

Emission in a Predetermined Polarization

The photons are preferably emitted in a predetermined polarization. The term "predetermined polarization" is intended to mean in one of the two states of a predetermined pair of complementary polarizations, for example a linear polarization with a certain direction. A birefringent plate may, for example, separate the two entangled photons according to their vertical or horizontal linear polarization.

A predetermined polarization of the entangled photons sent to each of the receivers makes it possible, in particular, to know the probability of a state in one polarization or its complementary polarization for any selected pair of complementary polarizations. It is thus possible to generate series of random bits on reception of said photons by the receivers, said series being complementary at the two receivers, the polarization of a photon received at the second receiver being the polarization complementary to the polarization observed at the first receiver.

A predetermined polarization is also necessary when using quarter-wave plates at the first receiver in order to rotate the direction of the polarization of the first photon.

In order to emit photons along a predetermined linear polarization, a plate or a prism comprising a birefringent optically transparent material, for example lithium niobate or rutile ($TiO_2$), the optical indices of which depend on the light polarization axis with which at least one of the two photons passes through, is for example arranged at the exit of the emitter.

This photon therefore emerges from the prism at one of the two different locations, depending on the linear polarization.

If the source of entangled photons emits the two photons in the same direction and along an axis perpendicular to the ordinary axis of the birefringent optically transparent material, the first photon is collected at the exit of the prism at the location through which the electromagnetic waves whose electric field is parallel to the ordinary axis of the birefringent optically transparent material emerge, in order to send it toward the first receiver.

In the same way, the second photon emerging through the location where the electromagnetic waves whose field is perpendicular to the ordinary axis emerge is collected in order to send it toward the second receiver.

In the case in which the two entangled photons are generated from the emitter at different locations and/or in different directions, it is possible to project each of the two photons onto birefringent prisms in a direction perpendicular to the ordinary axis of each of the prisms and to redirect each photon toward the receiver which is intended for it, the photons emerging through different locations of the prisms then preferably being lost or destroyed by projection onto an absorbent surface.

It is for example possible to use, for the first entangled photon, the one emerging from a first birefringent plate or a first birefringent crystal with a linear polarization parallel to the first axis, and as the second entangled photon, the one emerging with a linear polarization parallel to a first axis of the crystal used for the second plate or the second prism, which will have been adjusted in order to allow the photons to emerge along a predetermined polarization corresponding to the polarization of the photons that are entangled with the photons emerging from the first plate or the first birefringent prism with a direction parallel to the first axis.

In order to facilitate the transport of said photons toward the receivers, birefringent retardation plates that convert the linear polarizations of said photons into circular polarization are preferably placed at the exit of the locations from which the photons emerge from the prisms.

Another birefringent retardation plate is then preferably arranged at the entry of each of the receivers in order to reconvert the circular polarizations of the photons into linear polarization, this conversion into linear polarization making it possible to adjust the polarization axis precisely.

Transmission of the Photons

The photons may be transmitted from the emitters toward the receivers through space, through the atmosphere, an optical fiber or a combination of these means.

Lenses may be used for the transmission of the photons, in particular for transmission through space or the atmosphere. As appropriate, antireflection layers are preferably arranged on said lenses. The size of the lenses used is preferably matched to the length of the spatial or atmospheric transmission of the photons.

Conjugate mirrors which reflect the light emitted at the emitter may be used in order to adjust the emission direction of the conjugate photons for spatial or atmospheric transmission. A laser light emitter may, for example, scan a space in order to detect the receiver therein, the receiver reflecting the emitted light to it and the direction of the conjugate photons then being adjusted in order to be parallel to or coincide with the direction of the light reflected by the conjugate mirrors.

The light emitted by the laser light emitter may have a wavelength close to the wavelength of the entangled photons and be introduced into the objective lens used by the photons through a dichroic prism.

As a variant, if the wavelength is the same as that of the entangled photons, the light may be introduced through a birefringent prism when said photons have a linear polarization, the polarization of the light used for the guiding then being perpendicular to the polarization of the entangled photons directed toward the same receiver. A Pockels cell upstream of the receivers may be used to guide the light toward the conjugate mirrors when the guiding light arrives.

In another variant, the light waves used for the sighting may be emitted parallel to the entangled photons but separated for example by a distance of a few centimeters in order to be reflected by the conjugate mirrors.

In another variant, it is possible not to use a conjugate mirror but nevertheless to sight the receivers or targets close to them, the information according to which the targets are received being communicated by another communication means, for example by a radio signal or by quantum transmission.

The zone to be scanned may be identified by mapping reconnaissance of the zone in which said receivers are likely to be located.

The aforementioned phase modifier may moreover be used when the receivers are in relative rotation with respect to the emitter, in particular because of the rotation of the Earth or of the satellites, in order to allow the photons emitted in a fixed direction with respect to the emitter to enter each of the receivers with a fixed direction that is determined relative thereto.

Calibration Methods

The various mediums through which the photons pass from their place of emission to the two receivers may give rise to modifications of their phase which are not necessarily desired or expected.

Furthermore, these modifications may be different according to whether the photons are directed toward the first or the second receiver. Lastly, these modifications may vary in the course of time, in particular as a function of the weather or the temperature of the materials during their use.

The system according to the invention may be calibrated periodically by having the photons absorbed by the first receiver in polarizations belonging to predetermined pairs of complementary polarizations and, for each of these pairs, by observing one of the two possible polarizations in which the entangled photon is detected by the second receiver.

Thus, the invention furthermore relates to a method for calibrating a system as defined above, making it possible to determine the polarization state of a photon reaching the second receiver as a function of the polarization state in which its entangled photon has been absorbed at the first receiver, the method comprising the steps consisting in:

generating pairs of entangled photons from an emitter, the first photon of the pair being emitted toward a first receiver and the second photon of the pair being emitted simultaneously toward a second receiver, the first and second photons being entangled in terms of their polarization state, absorbing the first photons at the first receiver in a predetermined pair of polarizations, storing the one of the two possible polarizations in which each photon has been absorbed, and stopping the sending of photons by the emitter as soon as a predetermined number of each of the different polarizations have been observed, at the second receiver, duplicating the second photons to form fluxes of multiplied photons by using an amplification device, each multiplied photon having preserved the polarization state of the second photon, measuring the polarization states, that is to say the polarization directions and phase shifts of each flux of multiplied photons, and storing these measurements as well as their reception times, transmitting the list of stored polarizations and reception times of the photons from the first receiver to the second receiver, deleting from the list of photons received at the second receiver the photons which do not correspond to photons received at the first receiver and, likewise, deleting from the list of photons received at the first detector the photons whose corresponding photon has not been received at the second receiver, and calculating with the aid of, on the one hand: knowledge of the polarization state of two photons which are detected in complementary polarizations at the first receiver and whose entangled photons have reached the second receiver, and on the other hand knowledge of the polarization state of the corresponding entangled photons received at the second receiver, the Jones matrix making it possible to deduce the polarization of the photons received at the second receiver from the polarization of the photons received at the first receiver.

The storing of the states as well as the calculation of the Jones matrix are carried out by any suitable electronic devices, for example a microcontroller.

The Jones matrix calculated in this way makes it possible to calculate the polarization of the second entangled photon received at the second receiver as a function of the polarization of the absorption of the first photon by the complex absorber located at the first receiver.

A second calibration may be carried out, consisting in determining the probability for any photon arriving at the second receiver, the entangled photon of which has been absorbed during its transit toward the first detector, of belonging to each range of pairs of complementary polarizations which is detectable or identifiable by the second receiver; the range of a polarization P being defined as the set of polarizations assimilated by the polarization measuring instrument as having the polarization P.

Thus, the invention furthermore relates to a method for calibrating a system as defined above, making it possible to determine the probability of losing a photon during its transit from the emitter to the first receiver, consisting in:

- configuring the complex absorber of the first receiver in order to absorb the photons received at the first receiver in one of two complementary polarizations of a pair of absorption polarizations,
- successively generating a plurality of pairs of entangled photons from an emitter, the first photon of the pair being emitted toward a first receiver and the second photon of the pair being emitted simultaneously toward a second receiver, the first and second photons being entangled in terms of their polarization state,
- counting the number of photons received at the second receiver in each of the ranges of polarizations, detectable by the second receiver, which are different to one of the two ranges of polarizations of the entangled photons of the photons absorbed by the first detector.

It is thus possible to detect polarization ranges in which the entangled photons of photons lost in the course of transmission during their transit toward the first detector arrive in priority, or most probably, and thus preferably to avoid using the corresponding absorption polarizations in order to transmit data from the first to the second receiver. It is thus possible, by taking the quotient between the number of photons received at the second receiver with one of the polarizations corresponding to one of the two absorption polarizations at the first receiver, to calculate a transmission ratio of the photons between the emitter and the second receiver.

Measuring Instrument of the Second Receiver

The measuring instrument of the second receiver preferably comprises at least one photon detector arranged in order to measure the polarization of the light originating from the multiplication of the second photon.

The measuring instrument of the second receiver comprises, for example, a succession of semireflective plates arranged downstream of the optical amplifier, said plates directing the flux of multiplied photons, that is to say the light flux, with an equal intensity toward polarization measuring instruments arranged, for example, in order to measure the intensity of the flux along two perpendicular axes and/or the phase shift of the light between these two same axes.

The light may also be directed toward various polarizing filters after having passed through one or a succession of lenses which magnify the cross section of the light beam, thus allowing a plurality of mirrors or lenses to direct portions of this light beam toward the various polarization measuring instruments.

The Various Polarization Measuring Instruments Preferably Make it Possible to:

- measure the intensity of the component of the electric field of the light along a first axis x,
- measure the intensity of the component of the electric field of the light along a second axis y perpendicular to the first axis x,
- measure the phase shift between the light along its axis x and along its axis y,
- and, preferably, measure the phase shift between the light along its axis x', which is the bisector of x and y, and the light along its axis y'.

The measurement of the intensity of the light along two perpendicular axes is carried out, for example, by separating the light along two perpendicular axes by a birefringent plate or a prism followed by two light intensity sensors placed at exits of said plate or said prism. The measurement of the phase shift between two perpendicular components is carried out, for example, by separating the light along two perpendicular axes by a birefringent plate or prism followed, for the wave polarized along one of the two axes, by a rotation of this polarization axis by 90°, for example by using a rotating or chiral material or by the succession of quarter-wave plates, then a joint projection of these two waves, one of which has undergone the rotation of its electric field, through Young's slits onto a screen, the interference of the two light sources creating fringes whose positions depend on said phase shift.

Optical Amplifier

An "optical amplifier" refers to a device making it possible to duplicate a photon which is introduced into it, in particular the second photon of a pair of entangled photons, while preserving its polarization state.

Preferably, the optical amplifier is a doped-fiber amplifier.

For example, an erbium amplifier (EDFA) may be used, for example with a length of 4 m, into which the photon to be amplified is introduced at the same time as an amplifying wave with a shorter wavelength, which makes it possible to amplify the wave corresponding to the photon introduced with gains which may be of the order of 37 dB/m.

It is also possible to employ a doped-fiber amplifier (DFA) using a dopant other than erbium.

As a variant, the optical amplifier is for example a vertical-cavity amplifier (VCSOA), or an amplifier of the semiconductor type (SOA).

Antireflection Layers

In order to avoid the loss of photons, antireflection layers are preferably arranged at the interfaces between the adjacent transparent media with a different index through which the photons pass, as well as at the interfaces of the birefringent prisms and plates through which the photons pass, the antireflection layer preferably being matched to the index or indices of the material and to the angle or angles of incidence and polarization directions as well as to the wavelength of the photon which is intended to pass through it.

Dichroic Filters

The first and/or second receiver preferably comprise one or more dichroic filters making it possible to allow only the photons with a given wavelength to pass through, in particular a prism consisting of a dispersive transparent material, the filter or filters preferably being arranged before the measuring instrument or instruments or before the optical selector for the first receiver, this being the case particularly if the refractive indices of the nonlinear materials are modified by applying powerful light fluxes.

Assignment of the Photons to the Information with Synchronized Clocks

When the photons arrive at the second receiver, it is useful to be able to distinguish whether they should be assigned to the information transmitted, if it is an item of information transmitted several times, or whether it is an item of information that has not been encoded onto a pair of entangled photons.

This is because the photon emissions are sometimes irregular, and for example an emitter of the SPDS type as mentioned above may emit a double pair of photons without this being desired.

The emitter and each of the receivers preferably comprise a clock, the clocks of the emitter and of the receivers being synchronized with one another.

When combined with knowledge of the time of flight of the photons between the emitter and each of the receivers, this makes it possible to determine encoding and reception periods, which are preferably repetitive, during which a photon may be encoded at the first receiver in the encoding periods and its entangled photon may arrive at the second receiver in the reception periods.

If a plurality of photons are received during a reception period, the first receiver preserves an unchanged state until a moment lying, for example, between one quarter of the non-emission time after the end of the reception period and one half of the non-emission time δt' before the next reception period.

The second receiver preferably records the bits received for each reception period. It then advantageously transmits to the first receiver periodically, particularly if the device uses reflection in order to transmit a bit or a trit, for example, every 3000 reception intervals, or every 100 reception intervals without a photon, a list of the reception periods for which it has not received a photon, the transmitted photon possibly having been lost or no photon having been emitted by the emitter for this period, without the first emitter knowing whether it has reflected photons during these same periods, particularly if the device does not have a photon detector.

The transmission of this list may be carried out by instantaneous communication using the method according to the invention described below, or by a conventional communication means. On reception of this list, the first receiver then transmits the bits corresponding to these transmission periods for which no photon has reached the second receiver.

As a variant, the first receiver uses only the two different measuring instruments in order to transmit the information, one detecting linear polarizations and the other detecting circular polarizations.

The first receiver then retransmits each bit while selecting the measuring instrument suitable for the bit which it will transmit for this transmission period, and preferably keeps the selector in the same state until the end of the transmission period for which it receives a photon, allowing it to select the measuring instrument to be used for the transmission of the next bit.

The second receiver, when receiving the photons during the transmission periods, if it receives some of them, measures their polarization state for each transmission period and deduces therefrom the bit which it should add to the list of bits received.

If the transmission line between the emitter and the first receiver has a certain opacity and may absorb a certain proportion of the photons which pass through it, some photons may arrive at the second receiver with random polarizations during the reception periods.

The second receiver may then be configured in order to recognize at least some of the photons arriving in a polarization state which cannot be that of an entangled photon absorbed or reflected at the first receiver.

Offset of the Clocks

Preferably, the clocks which are components of the system, namely of the emitter and of the two receivers, are configured in order to take into account the phenomenon of a different running of time at different locations, in particular different altitudes of each of the components.

Synchronization of the Transmission Periods Between Receivers

A method which allows the first and second receivers to synchronize their clocks may be implemented.

For example, when measuring a first photon, the first receiver uses its own clock to note the time at which said photon has impinged on the measuring instrument.

The noted time, as well as preferably the references of the transmission interval, in particular the start time and optionally the duration in which the photon was expected, are subsequently transmitted to the second receiver.

The second receiver notes the reception time of the second photon in order to adjust its own clock so that the offset between the beginning of the transmission period and the time at which the first photon impinged on the measuring instrument of the first receiver is the same as the offset between the beginning of the reception period of the second photon at the second receiver and the time given by the clock for the reception of the second photon. If the transmission lines between the emitter and one or other of the receivers absorbs some photons, the emitter may send photons in a predetermined number, or over a predetermined duration, and each of the two receivers may note the average reception time of each of the photons, then one of the receivers may communicate this said average time to the other receiver.

The average time may be calculated by taking the average of the reception times of each of the photons, or only of the first and last photon received. The predetermined number of photons sent or the duration of their sending are preferably adjusted in particular as a function of the transmission/loss ratio of each of the photons on each of the two routes between the emitter and the receivers, and the average sending frequency of the photons. Since the transit durations of the photons between the emitter and each of the receivers may be different, the synchronization of the clocks between each of the receivers may differ depending on whether transmission of information in one direction or the other is involved. Each of the receivers may then have a synchronization register used to increment the clock time of said receiver with, or conversely subtract therefrom, a time lapse which is adjusted during the synchronization, in order to deduce therefrom the time of a clock which is synchronized for the reception of information coming from the other receiver.

Transmission Between the Emitter and Receiver

A method may be implemented which makes it possible to synchronize the periods of sending the photons to the receivers and the periods of reception at the receivers, these periods being time intervals during which photons can leave the emitter or reach the receiver.

For this purpose, the emitter may emit a brief first light signal followed or preceded by other light signals forming a message, which are preferably signed by a digital signature indicating the precise time, on its clock, of sending the signal.

On reception of said first light signal, the receiver notes the reception time then reads the sending time of the signal, takes the difference between the time of sending the signal and the time of the start of the period of transmission of the photons, during which the signal was sent, or, if it was sent outside a transmission period, the beginning of the preceding transmission period, and does the same with the reception time of the signal and the times of the beginning of the reception period.

If the difference between the emission date of the signal and the beginning of the transmission period is more than the difference between the reception date and the beginning of the reception period, the receiver may move the beginning of the transmission period forward, or conversely in the opposite case.

The calibration is advantageously repeated several times and the results are averaged, thereby making it possible to adjust the clocks with a precision greater than the imprecision of the sending and reception times of said light signals.

The wavelength used for the light signal is preferably the same as the wavelength of the entangled photons, so that it can be transmitted at the same speed as the entangled photons.

Assignment of the Photons to the Information without a Synchronized Clock

As a variant to synchronized clocks, the first receiver may comprise detector-transmitters and a waiting element, for example a reflector arranged in order to reflect the first photon with a predetermined polarization different to the polarizations detectable by the detector-transmitters, or alternatively an element arranged in order to absorb the first photon in a predetermined polarization different to the polarizations of the detector-transmitters.

The polarizations of the detector-transmitters are preferably complementary so that any photon directed toward an absorbent waiting element is absorbed.

The detector-transmitters are preferably arranged in order to detect the polarization of the photons in at least four different polarizations, these polarizations being grouped in complementary pairs so that any photon directed toward a detector-transmitter is thus detected and absorbed regardless of its initial polarization.

The detector-transmitter or detector-transmitters of the first receiver are used in order to send the information by selecting the detector pair used.

Each photon received by the first receiver during a predetermined period, also referred to as a "resting period", after the reception of a photon that has been used to send an item of information is sent to the waiting element, the duration of this predetermined period preferably being fixed and preferably being more than two times the clock imprecision of the receivers, and the start of this resting period being determined by the sensor or one of the two sensors absorbing the photon that have been used in order to send the information.

The second receiver is preferably arranged in order, on the one hand,

- to ignore the photons paired with the photons sent toward the waiting element, and on the other hand,
- to interpret two successive photons not paired with photons sent toward the waiting element as successive bits if they are separated from at least the resting period, from which the clock imprecision of the receivers is subtracted, and lastly
- to interpret two photons received successively in a time less than or equal to three quarters of the resting period, for example, as representing the same bit.

The second receiver may thus detect an error in the transmission of the information if: two consecutive photons with different polarizations, not paired with photons sent toward the waiting element, are received in a time less than the resting period minus the clock imprecision of the receivers.

This method has the advantage of requiring neither the placement of a switch at the emitter in order to restrict the emissions of entangled photons, nor clock synchronization.

The detector-transmitter or detector-transmitters of the first receivers may thus be used at the same time as a waiting element, particularly if the polarization in which they detect the photons is adjustable and can therefore be adjusted to the polarization used by the waiting element in order to absorb the photons.

Antinoise Device

Optical amplifiers have a tendency to emit photons in the opposite direction to the propagation signal, either during the amplification of the signal or in the absence of a signal, after molecules or atoms of the amplifier medium have been excited by a pump signal.

The second receiver comprises, for example, a switch arranged in front of the optical amplifier in order to limit the number of photons emitted by the amplifier toward the entangled photon source of the device.

The switch of the second receiver is, for example, configured in order to absorb or reflect the photon or photons subsequent to a first photon reaching said second receiver in a predetermined time interval.

The switch of the second receiver may be connected to the measuring instrument of the second receiver in order to allow light to pass through only in one direction or the other after a first photon has arrived and until the next photon is expected, or a predetermined time before this moment, for example one half of the resting period defined above.

Alternatively, the switch of the second receiver may allow photons to pass through only during the periods in which they are expected, in particular during the processing time intervals of the aforementioned photons.

Assignment of the Photons to the Information without a Synchronized Clock Using Optical Transmission Means with Low Transparency Optical fibers, although transparent, do not transmit all the photons presented at their entry. A loss of 0.20 dB per kilometer is common, losing for example 10 dB, i.e. 90% of the photons, in 50 km.

The effect of the photons lost in transit between the emitter and the first receiver is, however, different from the effect of the loss of the photons lost while traveling toward the second receiver; the entangled photons of the photons lost between the emitter and the first receiver being capable of arriving at the second receiver with any polarization corresponding to the polarization of the entangled photon absorbed in the line going toward the first receiver, while the loss of a photon in the line leading to the second receiver necessarily causes the disappearance of a photon potentially carrying information, that is to say one whose entangled photon has reached the first receiver.

Furthermore, the polarizations of the photons arriving at the second receiver after their entangled photons have been absorbed in transit toward the first receiver are not necessarily equidistributed among all possible observable polarizations.

For the transmission of information, pairs of complementary polarizations are preferably used for which corresponding polarizations observed at the second receiver are less numerous when the entangled photon of the photon detected at the second receiver has been absorbed during its transit toward the first receiver.

The invention furthermore relates to a method for calibrating a system as defined above, making it possible to determine two Jones matrices, one of which makes it possible to calculate the polarization of a photon arriving at the second receiver as a function of the polarization of a photon absorbed at the first receiver, wherein, preferably, the quantity of different polarizations observable at the second receiver is more than two times the inverse of the ratio of transmission of photons between the emitter and the first receiver, the method consisting in:

- configuring the complex absorber of the first receiver in order to absorb the photons received at the first receiver in one of two complementary polarizations of a pair of absorption polarizations,
- successively generating a plurality of pairs of entangled photons from an emitter, the first photon of the pair being emitted toward a first receiver and the second photon being emitted simultaneously toward a second receiver, the first and second photons being entangled in terms of their polarization state,
- for each polarization in which a photon is received at the second receiver, counting the number of photons that have reached said second receiver with this same polarization,
- stopping sending the photons when a predetermined number of photons has been received at the second receiver,
- determining the two polarizations in which the photons have been received most often at the second receiver, these polarizations being considered as the polarizations corresponding to the absorption polarizations of the photons at the first receiver,
- calculating the two possible Jones matrices of transformation of the polarizations, making it possible to deduce the polarization of a photon received at the second receiver from the polarization of a photon received at the first receiver.

Recording the polarization of at least one photon received at the first receiver and that of its entangled photon received at the second receiver, the correspondence being made for example by using their respective reception times, furthermore makes it possible to be able to select from the two calculated Jones matrices the one which makes it possible to calculate the polarization of the photons received at the second receiver as a function of the polarization of their entangled photons possibly received at the first receiver.

The following method may furthermore be used in order to transmit items of information from the first receiver to the second receiver, the method comprising the steps consisting in:

- successively generating a plurality of pairs of entangled photons from an emitter, the first photon of the pair being emitted toward a first receiver and the second photon being emitted simultaneously toward a second receiver, the first and second photons being entangled in terms of their polarization state,
- for each item of information to be transmitted, configuring the complex absorber of the first receiver in order to absorb a number NPT of transmission photons in a predetermined pair of complementary polarizations, referred to as the "absorption polarization pair", corresponding to the item of information to be transmitted, then, if the next item of information to be transmitted is not already known or is the same as the item of information just transmitted, configuring the absorber in a pair of polarizations referred to as a "waiting polarization pair", and if said item of information is the same as the item of information which has just been transmitted, counting at least NPT photons absorbed in this "waiting polarization pair",
- at the second receiver, for each pair of complementary polarizations, counting the number of photons received in one of the two polarizations of said polarizations since the last possible reception of a signal. As soon as the counter exceeds a predetermined threshold number NSP for one of the pairs and the pair of complementary polarizations is different to that of the last signal received, considering the item of information corresponding to this pair of polarizations as a new signal, and if this last item of information does not correspond to the waiting polarization pair, adding this item of information to the list of received items of information.

Alternatively, at the first receiver, the polarization absorber is systematically configured in order to absorb at least NPT photons in one of the two waiting polarizations after sending any information.

For Example, the Following Will be Used in Order to Transmit an Item of Information:

- transmission lines between the emitter and each of the receivers having an attenuation of 10 dB, i.e. a loss of 90% of the photons,
- transmission lines between the complex absorber which are configured in order to absorb the photons in 450 pairs of complementary polarizations, these pairs representing 80% of the photons received at the second receiver in the event of absorption of their entangled photons in their transits toward the first receiver,
- 200 photons may be selected for NPT and 6 for NSP, which according to calculations by the inventor makes it possible to obtain a transmission error ratio that is then less than 1 in 10,000.

In another example, with an error ratio of 97% corresponding to attenuation of the signal by 15 dB, by using 450 pairs of complementary polarizations, each polarization and phase shift being separated from one another by about 5°, the encoding of 1200 photons at the first receiver (that is to say NPT=1200) and the threshold number NSP being fixed at 14, according to calculations by the inventor, makes it possible to obtain an error ratio of less than 1 in 150,000 if the photons resulting at the second receiver from photons absorbed during their transits toward the first receiver are equidistributed over all the observable polarizations.

Treatment of Pairs of Photons Sent Simultaneously

The emitter may sometimes send pairs of entangled photons very close together. The photon detectors located at the first receiver therefore preferably count the number of photons absorbed, and not just the number of photons impacts on said first receiver. This counting makes it possible, for example, to take into account the intensity of the electromagnetic wave impinging on the photon detectors.

Groups of photons may thus arrive almost simultaneously at the second receiver, the latter not being capable of distinguishing the polarizations of the photons from one another. The polarization detector being capable of detecting an average polarization of all the photons detected "simultaneously", the polarization of the groups of photons arriving simultaneously at the second receiver, that is to say whose generated light intensity is for example greater by 50% than the intensity generated by a single photon, advantageously does not give rise to incrementation of the counters of photons received in diverse polarizations. It may, however, sometimes be that a plurality of photons reach the first receiver but only one of their entangled photons reaches the second receiver, and this is then counted.

Performance of the Device

The use of lines without loss or with low losses between the emitter and the first receiver, for example allowing the photons to travel in a vacuum, makes it possible to reduce or avoid the photons received at the second detector with a random polarization.

Likewise, the use of precise measuring instruments at the second receiver, making it possible either to increase the number of pairs of complementary polarizations or to ignore a large number of photons with random polarizations, may make it possible to:

increase the transmission distance of the photons, increase the baud rate by reducing the number of transmission photons NPT.

An increased switching speed of the polarization of the complex absorber of the first receiver makes it possible to increase the sending frequency of the entangled photons sent by the emitter.

An increased temporal accuracy of the polarization detectors of the second receiver, which makes it possible to distinguish the parasitism of diverse photons received very close together in time, also makes it possible to use a higher flux of entangled photons but also to reduce the number of receptions of photons received "simultaneously", as described above. This method has the advantage of requiring neither the placement of a switch at the emitter in order to restrict the emissions of entangled photons, nor clock synchronization.

Return Treatment of the Photons Toward the Emitter

Photons are sometimes reflected toward the emitter from the receivers. In order to prevent them from being reflected back by the emitter toward one of the receivers, the cavity or the material in which the entangled photons are produced by wave mixing, the refractive index of which is nonlinear, is preferably surrounded or covered with a material which absorbs light with a wavelength equal to that of the entangled photons.

Quantum Communication Methods

The invention furthermore relates to a quantum communication method using the system defined above, comprising the steps consisting in:

generating a pair of entangled photons from an emitter, the first photon of the pair being emitted toward a first receiver and the second photon of the pair being emitted simultaneously toward a second receiver, the first and second photons being entangled, the second receiver being located on the propagation path of the second photon further away from the emitter than the first receiver, so that it arrives there later, by using a polarization modifier, modifying the polarization state of the first photon when it reaches the first receiver into a polarization state dependent on the information to be transmitted, the state being selected from among at least two different pairs of complementary absorption polarizations, with the exception of exactly two pairs of perpendicular linear polarizations in which the polarization directions of one of the pairs are at 45° to the polarization directions of the other pair, by using an absorption instrument, absorbing the first photon in one of the two complementary polarizations of the selected pair, at the second receiver, duplicating the second photon to form a flux of multiplied photons by using an amplification device, the light that is created having preserved the polarization state of the second photon, measuring the average polarization state of the light flux and determining according to this measurement the polarization state of the first photon, in order to deduce therefrom the information transmitted by the first receiver.

The pair of complementary photons is preferably selected from among at least three different pairs of complementary polarizations.

The pair of complementary polarizations is for example selected from among 210 distinct pairs of absorption polarizations, in particular from among polarizations spaced apart by 9° in their polarization direction and phase-shifted by 9°.

The invention furthermore relates to a quantum communication method using the system defined above, comprising the steps consisting in:

generating a pair of entangled photons from an emitter, the first photon of the pair being emitted toward a first receiver and the second photon of the pair being emitted simultaneously toward a second receiver, the first and second photons being entangled, the second receiver being located on the propagation path of the second photon further away from the emitter than the first receiver, so that it arrives there later, according to the information to be transmitted, selecting to absorb or not absorb the first photon in one of two pairs of complementary polarizations when it reaches the first receiver, by using an optical selector which does or does not direct said photon toward an instrument or toward a plurality of instruments, in the event that the selection is made not to absorb the photon in a predefined polarization, trapping said first photon in a protection device making it possible to avoid its absorption at least so long as the second photon has not reached the second receiver, at the second receiver, duplicating the second photon to form a flux of multiplied photons by using an amplification device, each multiplied photon having preserved the quantum state of the second photon, measuring the average quantum state of the flux of multiplied photons and determining according to this measurement whether the first photon has been absorbed at the first receiver, and/or with which instrument, in order to deduce therefrom the information transmitted by the first receiver.

Preferably, the polarization of the pair of entangled photons is indeterminate in the polarization or polarizations, of the pair of complementary polarizations, in which the instruments of the first receiver absorb them.

For example, the pair of entangled photons reaches the receivers with a linear entangled polarization, one of the two complementary absorption polarizations being circular, the second receiver being arranged in order to distinguish whether the average polarization of the flux of multiplied photons is circular or linear, and to determine according to this distinction whether or not the first photon has been measured.

As a variant, the pair of entangled photons reaches the receivers with a circular entangled polarization, the absorption quantum state of the photons being a linear polarization, the second receiver being arranged in order to distinguish whether the average polarization of the flux of multiplied photons is circular or linear, and to determine according to this distinction whether or not the first photon has been measured.

As a variant, the pair of entangled photons reaches the receivers with a vertical or horizontal linear polarization, the quantum state measured at the first receiver being a linear polarization at 45° or −45° to the vertical or the horizontal, the second receiver being arranged in order to distinguish whether the average linear polarization of the flux of multiplied photons (P20) is at 45° or −45°, or the vertical or the horizontal, and to determine according to this distinction whether or not the first photon has been measured.

Transmission of Information

The system according to the invention and the quantum communication method described above make it possible to transmit items of information either of the binary type, in the form of bits, or discrete or continuous values between the first and the second receiver.

Preferably, a plurality of pairs of entangled photons are generated successively by the emitter, each pair of photons making it possible to transmit an item of information, for example of the binary type, from the first receiver to the second receiver.

For example, the selection may be made to absorb the first photon at the first receiver in order to transmit a bit 1 and reflect it in order to transmit a bit 0. Measurement at the second receiver of the average quantum state of the flux of multiplied photons then makes it possible to determine whether a bit 1 or a bit 0 is being transmitted from the first receiver quasi-instantaneously.

Several methods may be implemented in order to secure the communication and avoid transmission errors, for example due to double pairs of photons emitted simultaneously.

For example, during time intervals established beforehand by using the clocks described above, only the first photon reaching a receiver is preferably considered, the subsequent photons being ignored.

As described above, the photons may be counted when they arrive at a polarization detector. If the counting reveals the arrival of more than one photon during a predefined time interval, the bit is not transmitted during this interval, and it is for example transmitted in the next time interval, or, preferably, the same bit is retransmitted again.

At the second receiver, counting the photons arriving in the time interval in which they are expected may advantageously make it possible to create a temporary list of unreceived bits.

Bidirectional Communication

In order to allow bidirectional communication, that is to say in order to allow each of the two receivers to transmit information to the other receiver, a plurality of emitters may be used.

The system according to the invention may, in particular, comprise a second emitter capable of generating one or more pairs of entangled photons, the second emitter being located closer to the second receiver than to the first receiver.

As a variant, at least some of the photons may be made to travel an indirect path so as to lengthen their transport time toward one of the receivers, for example by having the photons reflected on one or more intermediate mirrors or having them pass through media with high refractive indices, or alternatively by transporting them in optical fibers with varied lengths.

This lengthened journey may for example alternate, at a rate which is fixed or variable as a function of requirements, with the unlengthened journey so as to be able to use the entangled photons sometimes in order to transmit the information from one point to another, and sometimes in the other direction. Optical switches located upstream of the receivers and synchronized with the switch attached to the emitter, making it possible to send the photons on a lengthened path, may be installed in order to send said photons toward receivers of the first receiver type, as described above, or conversely of the second receiver type.

Method of transmitting a key and of verifying that this transmission is not being eavesdropped.

It is possible to verify that an item of information transmitted by a flux of photons from the emitter to the second receiver has not been eavesdropped by implementing the following steps:

- the second receiver establishes a first list of the reception dates of the photons that conveyed the item of information, and the relative polarization designating that of the two complementary polarizations in which each photon was received;
- the second receiver generates a message containing the list collected in the preceding step, creates an electronic signature of this list and transmits said list and the signature to the receiver;
- the first receiver receives the list and signature then verifies said signature;
- the first receiver makes a second list consisting of elements of the first list for which the relative polarizations of the photons received by the first and second receivers are equal, or indeed for which the entangled photon never reached the first receiver, two entangled photons having different relative polarizations;
- if the number of elements of the second list restricted to pairs of entangled photons each of the two photons of which reached their respective receivers is lower than the product of a predetermined ratio multiplied by the count of the elements of the first list restricted to pairs of entangled photons each of the two photons of which reached their respective receivers, then the item of information is declared to have been transmitted without having been eavesdropped.

The Following Steps May then be Carried Out:

- if the item of information is declared to have been transmitted without having been eavesdropped, then the second list is sent signed by the first receiver to the second receiver, then a third list is created by the first receiver, this list consisting of the relative polarizations of the photons featuring in the first list but not featuring in the second list,
- on reception of the second list by the second receiver and after verification of the signature, the third list is recreated in the second receiver using the first and second lists, then a signed message, confirming successful receipt of the second list, is sent by the second receiver to the first receiver; and
- the second receiver uses the third list as shared key with the first receiver, and, on reception by the first receiver of the message transmitted by the second receiver in the preceding step, the first receiver uses the third list as shared key in exchanges with the second receiver.

A polarizing filter may be placed upstream of the second receiver.

Method for Comparing a First Dataset and Second Dataset

The invention further relates to a method, implemented by a least one apparatus, for comparing a first dataset and second dataset, in particular with a view to determining whether these two datasets are identical, this method comprising the following steps:

a) mixing a number, called the mixer number, with the first dataset, using a mixing function, in order to obtain mixed data,
b) hashing the mixed data using a hash function, and
c) comparing the hash thus obtained in step b) with a third dataset assumed to be the hash of the second dataset mixed with the same mixer number as that used in step a) and with the same mixing function.

By virtue of the invention, and in particular of the mixing of the first dataset with a mixer number prior to the hashing, it becomes very improbable to be able to create data similar to this first dataset that, after having been mixed with the same mixing number, will have the same hash is the mixed first dataset.

Preferably, the method according to the invention does not require two datasets to be simultaneously present in the apparatus.

Preferably, the mixer number is generated randomly.

The mixer number is preferably generated by the apparatus. As a variant, the mixer number is generated by another trusted apparatus.

The generation of the mixer number may be based on a pair of input values that are physical quantities at least one of which varies continuously, such as for example the temperature and the time, or on a quantum phenomenon. For example, such a generation may be based on which of two Young's slits a photon chooses to use to pass through a plate.

Preferably, the mixing operation in step a) is carried out by the apparatus. As a variant, the mixing is carried out by another trusted apparatus.

The mixing function combines the first dataset and the mixer number. It is, preferably, an XOR logic function that adds the bits of the first dataset and those of the mixer number, one by one. Since the size of the mixer number is generally smaller than the size of the first dataset, it is possible to add via an XOR the bits of the mixer number to the first or last bits of the first dataset.

The mixer number may have the same size as the first dataset. In this case, the addition via the XOR function is carried out on all the bits, one by one.

Alternatively, the mixing function is a suffix function consisting in adding the mixer number to the end of the first dataset.

The mixing function may even be an encrypting function using the mixer number as encryption key to encrypt the first dataset.

In one embodiment, the mixing function is a combination of an XOR function, a suffix function consisting in adding the mixer number to the end of the first dataset and an encryption function using the mixer number as encryption key to encrypt the first dataset.

Preferably, the data in step b) are hashed by the apparatus. As a variant, the hashing is carried out by another trusted apparatus.

Preferably, the hash function is chosen among SHA1, SHA2, SHA256 and MD and the Jenkins function.

First Method Verifying the Integrity of a Message

A first variant of the method according to the invention is a method for verifying with the apparatus the integrity of a message originating from a sender, the method comprising:

i. the apparatus receiving the message and an identifier of the message, said message forming the first dataset,
ii. generating the mixer number,
iii. implementing steps a) and b), in which the message is mixed with the mixer number then hashed,
iv. optionally encrypting the mixer number,
v. the apparatus sending the identifier of the message and the optionally encrypted mixer number to the sender of the message,
vi. the apparatus receiving the encrypted third dataset, preferably with the identifier of the message, originating from the sender,
vii. decrypting the third dataset, and
viii. implementing step c), the integrity of the message being ensured if the third dataset decrypted in step vii and the hash obtained in step b) are identical.

By "integrity" of the message, what must be understood is its non-alteration, for example by a malicious third-party that intercepted it during its transmission.

The identifier of the message may be a sequence of alphanumeric characters and/or signs able to be converted into a digital word via an ASCII code inter alia.

The identifier of the message may contain the identifier of the sender and an order number of the message.

The authentication of the sender is in particular ensured by the decrypting operation in step vii.

The decryption may be performed with an encryption key kept secret between the apparatus and the sender.

Preferably the mixer number is kept secret and a renewable key of the size of the hash (third dataset) is used, especially with an XOR as an encryption function.

Alternatively, the mixer number is kept secret and a non-renewed symmetric key is used with a symmetric encryption function.

Alternatively, the mixer number is kept secret and a non-renewed asymmetric key pair is used with an asymmetric encryption function.

Alternatively, the mixer number is kept secret and a non-renewed symmetric key is used with a symmetric encryption function.

Alternatively, the mixer number is a renewable key and another renewable key of the size of the hash (third dataset) is used, especially with an XOR as an encryption function.

Alternatively, the mixer number is a renewable key and a non-renewable key of the size of the hash (third dataset) is used, especially with an XOR as an encryption function.

Alternatively, the mixer number is a renewable key and, a non-renewed symmetric key is used with a symmetric encryption function.

Alternatively, the mixer number is a renewable key and, a non-renewed asymmetric key is used with an asymmetric encryption function.

Preferably, the mixer number identifier is exchanged between the sender and the apparatus, which are each able to find the corresponding mixer number in a memorized list of mixer numbers.

In another embodiment, the mixer number is generated randomly after each use. Such mixer number may be encrypted by a one-time key. Alternatively, the mixer number is encrypted by a symmetric or an asymmetric function.

This first variant of the invention makes it possible to ensure both the integrity of the received message and of the identity of the sender of the message.

The steps relating to sending and receiving the data may be carried out using the same communication protocol, or using different communication protocols. For example, the data received in step i are received via Wi-Fi, the data sent in step v are sent via 4G and the data received in step vi are received via WiMAX.

In step i, the apparatus may also receive an identifier of the sender. This identifier is useful if the apparatus is able to receive messages from various senders, such an identifier allowing it to choose the encryption keys to be used to encrypt or decrypt the information exchanged with the sender during the encrypting and decrypting operations described in this first variant of the invention.

Preferably, the Method According to this First Variant Comprises, Between Steps v and vi:

- the sender receiving the identifier of the message and the optionally encrypted mixer number,
- optionally decrypting the mixer number,
- identifying, using the identifier of the message, the message sent to the apparatus,
- mixing the message with the optionally decrypted mixer number using the mixing function,
- hashing the data resulting from the preceding step using the hash function,
- encrypting the hash resulting from the preceding step, and
- sending to the apparatus the encrypted hash preferably with the identifier of the message.

The optional encryption of the mixer number in step iv is preferably carried out by the apparatus.

The optional encryption of the mixer number makes it possible to prevent this number from being intercepted and altered by a malicious third-party.

Preferably, the optional encryption of the mixer number is carried out using a single-use key of a size at least equal to that of the number. Since the key is single-use, a new key is used each time a mixer number is sent.

The encryption may also be carried out using a symmetric key. The symmetric encryption key is kept secret between the sender and the apparatus and is preferably renewed after a certain number of transmissions.

Alternatively, the optional encryption of the mixer number is asymmetric, being carried out either using a public key of the sender known to the apparatus, so as to allow the decryption by the sender using its associated private key, or using a private key of the apparatus the public key of which is known to the sender.

Thus, a third party is prevented from learning or altering the mixer number.

Preferably, the decryption in step vii is carried out by the apparatus.

The decryption in step vii may be carried out using a symmetric key, if the encryption in step iv is carried out using a single-use key.

Alternatively, the decryption in step vii is carried out using a single-use key, if the encryption in step iv is carried out using a symmetric key.

The decryption in step vii may also be carried out using other methods, for example using a public key known to the apparatus, associated with a private key of the sender having served to encrypt the hash received in step vi. Thus, the apparatus is capable of certifying the identity of the sender.

The mixer number may have the same size as the symmetric key that serves to encrypt it, if such a symmetric key is used, and also the same size as the hash.

Preferably, the private, symmetric and single-use encryption keys and the mixer numbers are unguessable and unobservable by third-party devices, to prevent listening to the data sent by the sender or the apparatus from making it possible to generate and transmit fraudulent second datasets that would cause the integrity of messages received by the apparatus but transmitted by a sender other than that legitimately supposed to hold said keys to be wrongly recognized.

If the encryption key X of the mixer number x is known, then the hash of the mixed message may be known, because it is enough to decrypt the encryption of x and to compute the mixture of the message before hashing it. The key Y encrypting the hash may then also be guessed or known to belong to a small universe, the hash of the mixed message and its encryption with Y both being known or observable. The encryption key Y is therefore a function F of the encryption key X, or else the encryption key Y belongs to a universe depending on the encryption key X. The observation of a plurality of transmissions causes a plurality of functions F to appear, and the values of the keys X and Y are at the intersection of these functions. It is preferable to avoid this situation. It is therefore recommended either to use, for the key X or the key Y, values that change over the course of the transmissions, or to use encrypting functions such that, for each observation of exchanges of the triplet "message, encrypted number, encrypted hash", the universe of the keys Y for each possible X is large; this making the universe resulting from the intersection of these universes deducible at each observation large. It is not recommended to take, for the key Y, the randomly generated mixer number x. Specifically, if the mixer number x is used as encryption key Y, or indeed if the key Y is computed depending on the mixer number x using a defined formula, knowing the encrypted value C of the mixer number x encrypted with the key X, the mixer number x, and therefore Y, becomes another function G of the key X; and the keys X and Y would be at the intersection of the function F and of this new function G. Preferably, the key X or the key Y is renewed after each exchange.

The apparatus may furthermore comprise a counter of consecutive failed verification attempts that triggers a blockage thereof when a defined number is reached, the apparatus possibly being unblocked during the renewal of the encryption key used to encrypt the mixer number or the encryption key used to encrypt the hash.

Alternatively, the apparatus may impose a predetermined number of unsuccessful successive verification attempts of messages arriving or sent by a same sender, after which predetermined number, and after a set period of time, the apparatus either places the received messages or the message sent by the same sender in a queue or, preferably, ignores them, before again either trying to decrypt the messages placed in the queue or trying to resume decrypting the messages that are still arriving after the expiry of the set period of time. This approach is advantageously implemented by a device sending back to the sender of the messages placed in a queue or ignored, a reply message to inform it about the treatment of its message. For instance, three messages received consecutively from a sender that cannot be verified may cause the device to discard messages sent by the same sender for a minute, after having told the said sender that its messages are being ignored for such time.

Second Method Verifying the Integrity of a Message

A second variant of the method according to the invention is a method for verifying with the apparatus the integrity of a message originating from a sender, the method comprising:

i. the apparatus receiving the message, the encrypted third dataset and the encrypted mixer number, ii. decrypting the mixer number and the third dataset, and iii. implementing steps a) to c), the integrity of the message being ensured if the hash obtained in step b) and the third dataset decrypted in step ii are identical.

The decryption may be performed with an encryption key kept secret between the apparatus and the sender.

Preferably, the mixer number is kept secret and a renewable key of the size of the hash (third dataset) is used, especially with an XOR as an encryption function.

Alternatively, the mixer number is kept secret and a non-renewed symmetric key is used with a symmetric encryption function.

Alternatively, the mixer number is kept secret and a non-renewed asymmetric key pair is used with an asymmetric encryption function.

Alternatively, the mixer number is kept secret and a non-renewed symmetric key is used with a symmetric encryption function.

Alternatively, the mixer number is a renewable key and another renewable key of the size of the hash (third dataset) is used, especially with an XOR as an encryption function.

Alternatively, the mixer number is a renewable key and a non-renewable key of the size of the hash (third dataset) is used, especially with an XOR as an encryption function.

Alternatively, the mixer number is a renewable key and, a non-renewed symmetric key is used with a symmetric encryption function.

Alternatively, the mixer number is a renewable key and, a non-renewed asymmetric key is used with an asymmetric encryption function.

Preferably, the mixer number identifier is exchanged between the sender and the apparatus, which are each able to find the corresponding mixer number in a memorized list of mixer numbers.

In another embodiment, the mixer number is generated randomly after each use. Such mixer number may be encrypted by a one-time key. Alternatively, the mixer number is encrypted by a symmetric or an asymmetric function. Preferably, the method according to this second variant of the invention comprises, before step i:

the sender generating the mixer number, mixing the mixer number with the message, using the mixing function, hashing the data resulting from the preceding step using the hash function, encrypting the hash resulting from the preceding step and forming the third dataset, encrypting the mixer number, and sending, to the apparatus, the message, the encrypted third dataset and the encrypted mixer number.

These steps are carried out by the genuine sender and allow the alteration of the message by an unauthorized third party to be detected.

The decryption in step ii of the mixer number and of the third dataset is preferably carried out by the apparatus.

Preferably, the encryption of the mixer number is carried out using a single-use key, and the encryption of the third dataset is carried out using a symmetric key, the symmetric key preferably being renewed occasionally.

Alternatively, the encryption of the mixer number is carried out using a symmetric key, and the encryption of the third dataset is carried out using a single-use key, the symmetric key preferably being renewed occasionally.

The encryption of the mixer number and the encryption of the third dataset may also be of the same type, or of different types, these types of encryption possibly employing symmetric keys, or asymmetric keys.

If a pair of asymmetric keys is used for the encryption of the mixer number, the private key of said pair is preferably kept by the apparatus, the corresponding public key then being known to the sender.

The encryption of the third dataset may be carried out using a private key kept by the sender, the corresponding public key then being known to the apparatus.

Thus, by decrypting the mixer number and the third dataset, the apparatus is capable of certifying the identity of the sender.

The encryption of the mixer number and that of the third dataset may be carried out using the same encrypting function, in particular when the encryption of the mixer number is asymmetric.

Alternatively, the encryption of the mixer number and that of the third dataset are carried out by two different encrypting functions.

Preferably, the types of encrypting functions to be used form part of the configuration of the sender and of the apparatus, prior to the setup of the communication between the latter two.

Third Method Verifying the Integrity of a Message

A third variant of the method according to the invention is a method in which the first dataset is present in the apparatus and the second dataset is present in a second apparatus, the method comprising:

i. implementing steps a) and b), ii. encrypting the mixer number, iii. the apparatus sending, to the second apparatus, the encrypted mixer number, iv. the apparatus receiving an encrypted hash of the second dataset, v. decrypting the encrypted hash, and vi. implementing step c).

The decryption may be performed with an encryption key kept secret between the apparatus and the sender.

Preferably, the mixer number is kept secret and a renewable key of the size of the hash is used, especially with an XOR as an encryption function.

Alternatively, the mixer number is kept secret and a non-renewed symmetric key is used with a symmetric encryption function.

Alternatively, the mixer number is kept secret and a non-renewed asymmetric key pair is used with an asymmetric encryption function.

Alternatively, the mixer number is kept secret and a non-renewed symmetric key is used with a symmetric encryption function.

Alternatively, the mixer number is a renewable key and another renewable key of the size of the hash is used, especially with an XOR as an encryption function.

Alternatively, the mixer number is a renewable key and a non-renewable key of the size of the hash is used, especially with an XOR as an encryption function.

Alternatively, the mixer number is a renewable key and, a non-renewed symmetric key is used with a symmetric encryption function.

Alternatively, the mixer number is a renewable key and, a non-renewed asymmetric key is used with an asymmetric encryption function.

Preferably, the mixer number identifier is exchanged between the sender and the apparatus, which are each able to find the corresponding mixer number in a memorized list of mixer numbers.

In another embodiment, the mixer number is generated randomly after each use. Such mixer number may be encrypted by a one-time key. Alternatively, the mixer number is encrypted by a symmetric or an asymmetric function.

Preferably, the method according to this third variant of the invention comprises, between steps iii and iv:

- the second apparatus receiving the encrypted mixer number,
- decrypting the mixer number,
- creating a modified copy of the second dataset using the mixer number and the mixing function,
- hashing the modified copy of the second dataset using the hash function,
- encrypting the hash resulting from the preceding step and forming the third dataset, and
- the second apparatus sending, to the apparatus, the encrypted hash of the second dataset.

The encryption of the mixer number in step ii and the decryption of the encrypted hash in step v are preferably carried out by the apparatus.

Preferably, the encryption of the mixer number is carried out using a symmetric encryption key shared with the second apparatus.

The encryption of the hash may be carried out using a single-use key and the encryption of the mixer number may be carried out using a symmetric key that is renewed occasionally.

Alternatively, the encryption of the mixer number is carried out using a single-use key and the encryption of the hash is carried out using a symmetric key that is renewed occasionally.

The encryption of the mixer number and the encryption of the hash may also be of the same type, or of different types, these types of encryption possibly employing symmetric keys, in particular single-use keys, or asymmetric keys.

Shared Quantum Key Generation Method

The invention may be used in quantum communication methods, especially in Quantum Key Distribution E91 where a pair of entangled photons is used to generate a shared secret between two photon receivers.

Another aspect of the invention is a shared quantum key generation method using a quantum communication system, the system comprising:

- an emitter of entangled photons, configured to generate at least one pair of entangled photons comprising a first photon emitted on a first propagation path and simultaneously a second photon emitted on a second propagation path different from the first propagation path;
- a first receiver arranged on the first propagation path, comprising a first polarization measurement base configured to measure a polarization state of a photon received by the first receiver; and
- a second receiver arranged on the second propagation path, comprising a second polarization measurement base configured to measure a polarization state of a photon received by the second receiver, the clocks of the two receivers being synchronized so that two photons of a same photon pair arriving at the receivers arrive at the same time according to the clocks of the reached receivers;
- wherein the first receiver establishes a first list comprising the reception dates and a second list comprising these reception dates and the polarization states of the photons received by the first receiver, and the second receiver establishes a third list comprising the reception dates and a fourth list comprising these reception dates and the complementary polarization states of the photons received by the second receiver;
- wherein the first list and/or the third list are exchanged between the first receiver and the second receiver, and are preferably signed electronically;
- wherein upon reception of the third and/or first lists, respectively, the first receiver and/or the second receiver establish(es) a fifth list comprising the dates at which the two photons of the same pairs were received at both receivers, as some photons may have been lost during the transmission between the emitter and one or the two receivers;
- wherein if only one of the two receivers establishes the fifth list, the said fifth list is transmitted, preferably electronically signed, to the other receiver, so that the first receiver and the second receiver establish respectively a sixth list and a seventh list of polarization states of the photons as received by the first receiver, the sixth list being derived from the second list and the fifth list, the seventh list being derived from the fourth list and the fifth list, each polarization state on the sixth list of a photon received at a time marked on the fifth list being the same polarization state of the corresponding photon received at the same time and marked on the second list, each polarization state on the seventh list of a photon received at a time marked on the fifth list being the complementary polarization state of the corresponding photon received at the same time and marked on the fourth list;
- wherein respective signatures of the sixth list and the seventh list are exchanged between the first and the second receivers, according to the method of the invention, preferably with a mixer number renewed each time and a renewed one-time key used for the hash encryption;
- wherein the said sixth and seventh lists can be used as a shared list of random bits. From this shared list, one-time keys or lists of random rotation angles of the polarization measurement bases, for instance, can be extracted.

A signed message may be exchanged between the two receivers before the sixth and seventh lists are used as one-time keys.

The polarization measurement bases may be rotated randomly and simultaneously by a same angle kept secret between the two receivers.

The sixth and seventh lists may be used as lists of random rotation angles of the polarization measurement bases.

The photons are preferably sent in a set polarization that is not the polarization of the photons that can be measured by the receivers, for instance the photons may be sent circularly polarized, while being detected in orthogonally linearly polarized states, or sent linearly polarized in a direction that is not the direction of the polarization in which they may be detected, preferably set at 45° to the linear polarization direction in which the photons polarizations are detected by the receivers.

The direction of the polarization angle at which the polarizations are detected by the receivers, may be changed periodically and randomly by the same angle at both receivers, the change being preferably a change of 0° or 45° and, preferably the linear polarization angle at the emitter being changed by the same angle if the emitter does emit the photons linearly polarized. The change may occur for instance every millisecond. This would avoid a spying device from sending pairs of photons to both receivers in known polarizations that can be detected by the receivers, one of the photons being in the complementary polarization of the other and arriving at the same time at the receivers according to the 'synchronized' clocks, as the direction at which the photons may be detected by the receivers may not be known by the spying device.

The angle of the polarization may be changed, for instance by the use of a by-circuit for the photons ahead of the receivers whereby a first switch may divert the incoming photon to a photon polarization rotating device and a second switch allows to send the photon exiting the said polarization rotating device towards the said receiver, so that in a first mode the photons bypasses the polarization rotating device while in another mode the photons go through the polarization rotating device before entering the receivers. The photon rotating device may be made for instance of a chiral material such as 1.4 to 2.4 ηm CdsE nanoparticles (source inorganic Nanostructures with Strong Chiroptical Activity Anastasia Visheratina & Nicholas A. Kotov* University of Michigan), or such as a device made of a first birefringent prism separating the light into two beams of linearly polarized light which each go through two quarterly wave plates set an angle between them so that light leaves the second quarter wave plate linearly polarized at an angle to the polarization direction at which it enters the first quarter wave plate, the two beams of linearly polarized light leaving the second quarter wave plates being joined into a single beam by going through a second birefringent prism.

The angle changes may be set accordingly to single use keys shared between the two receivers and, if necessary, the sender. If the angle change is applied only to the two receivers, for instance if the sender sends the photons in a circularly polarized state while the readers read the photons in a linearly polarized state, the single use key may be renewed using keys generated by the here described shared quantum key generation process.

By "complementary polarization state of a given photon", it is meant the polarization state in which the photon entangled to the said given photon should be.

Moreover, the photon path is preferably physically protected against the insertion of a spying device in a first zone, in its part where the photons travel not entangled. For instance, if the photon path is longer by a measured length between the photon emitter and the second photon receiver, than between the emitter and the first photon receiver, the path taken by the photon between the emitter and the second receiver is physically monitored at least close to the second receiver for the said measured length.

The said measured length can be, for instance, measured physically, especially if the photons travel in optical fibers. Also, and particularly when travelling through free space, the measure can be done, for instance, having placed really synchronized clocks on the two receivers (as opposed to the synchronized clocks described above), and having checked at the time of such measurement that no spying device has been inserted between the emitter and the receivers.

Moreover again, the photon path is preferably physically protected in a second zone ahead of the first zone if any or ahead of the detector if there is no first zone, against the insertion of a spying device. This second zone is configured so that the photon travels in it during more time than the time arrival uncertainty at which photons are detected at both receptors.

If a spy photon detector and emitter is introduced ahead of the first detector, such spy detector will detect photons and their polarization before remitting photons in the same polarization to the second detector. However, such re-emitted photon will need to travel through the first zone and the second zone thereby arriving at time different than the time it would have arrived should no spying device have interfered, and such time difference being noticeable by the second receiver.

A spy emitter may send a first photon entangled to a second photon to the legitimate first receptor and detect the polarization state of the first entangled photon by looking at the polarization of the second photon. However, in order to transmit such polarization state to the second emitter, it will need to send a polarized photon in the proper state but such photon will need to travel first to the protected second zone than through the protected zone, taking more time and therefore arriving at a time different than the time the initial spy photon was detected by the first receiver.

If on the other hand, a spy device sends a first photon entangled to a second photon to the second receiver and detects its polarization state it could then send to the first receiver a photon in the same polarization; however this photon will arrive after the second receiver has received its detected photon therefore at a time, according to the 'synchronized' clocks different from the time when the other photon arrived at the second receiver.

The sizes of the first and third lists are preferably chosen with a tolerance coefficient so that the sixth and seventh lists have reasonable chance, for instance at least 50% of chance of being equal, should nothing has interfered in the entangled photon transmission process. If, for instance, entangled photons are read in corresponding states at both receivers in 99.9% of the cases, i.e. if the reading of their polarization state is correct in 99.9% of cases, the sixth and seventh lists may be 500 bits long and the first and second lists may comprise 5000 successive reception times if 90% of the entangled photons are lost between the photon emitter and the receivers, each photon receiver at any receiver having only a 10% chance that its entangled photon has been received by the other receiver.

Fourth Method Verifying the Integrity of a Message

A fourth variant of the method according to the invention is a method for verifying that a dataset present in the apparatus has not been modified between two times d1 and d2, this dataset forming, at the time d1, the first dataset and, at the time d2, the second dataset, the method comprising:

i. implementing steps a) and b), ii. the apparatus securely saving the mixer number and the hash obtained in step b), iii. creating a modified copy of the second dataset using the mixer number and the mixing function, iv. hashing the modified copy using the hash function to form the third dataset, and v. implementing step c).

Advantageously, the method according to this fourth variant does not require the dataset to be kept securely.

Computer-Program Product

Another subject of the invention is a computer-program product containing instructions readable by a processor of an apparatus for implementing the method according to the invention, according to any one of the variants defined above.

BRÉVE DESCRIPTION DES DESSINS

Figure 1B:
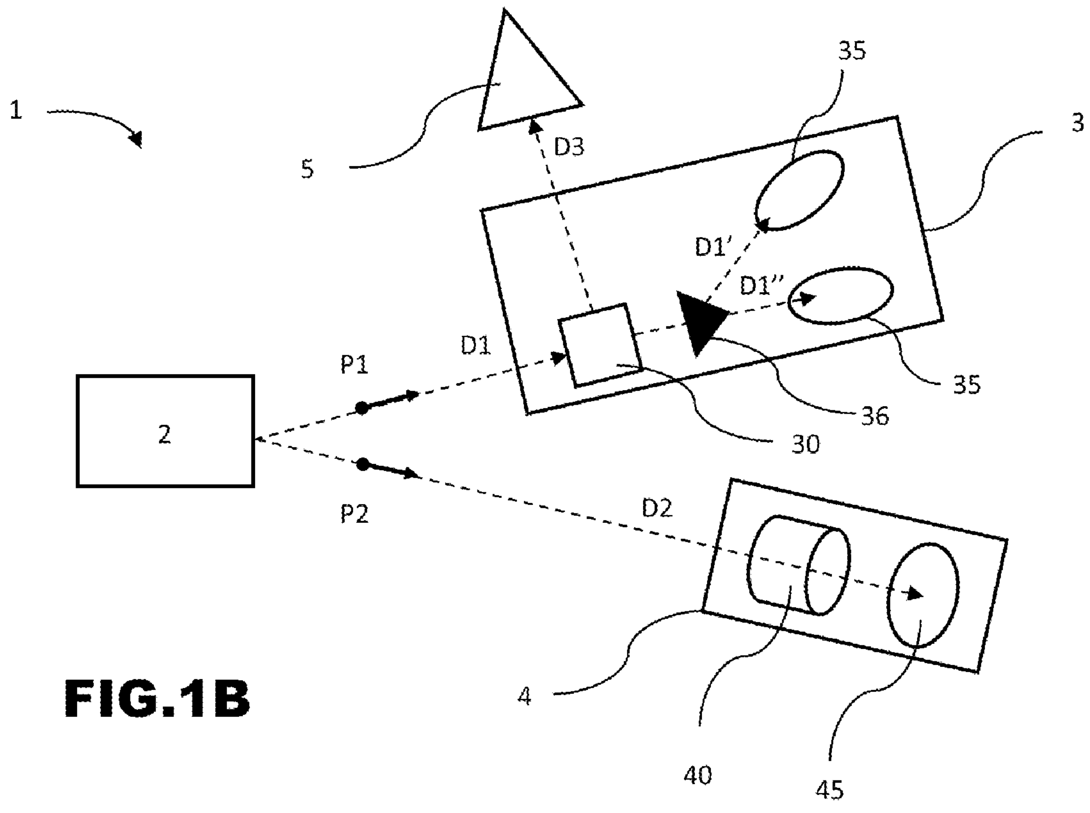
Figure 2A:
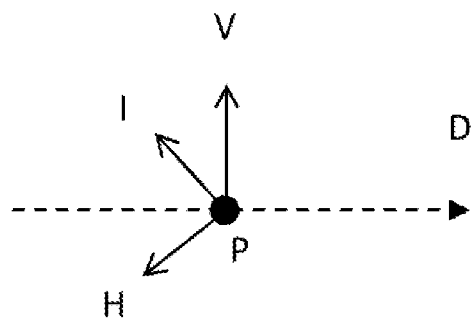
Figure 4A:
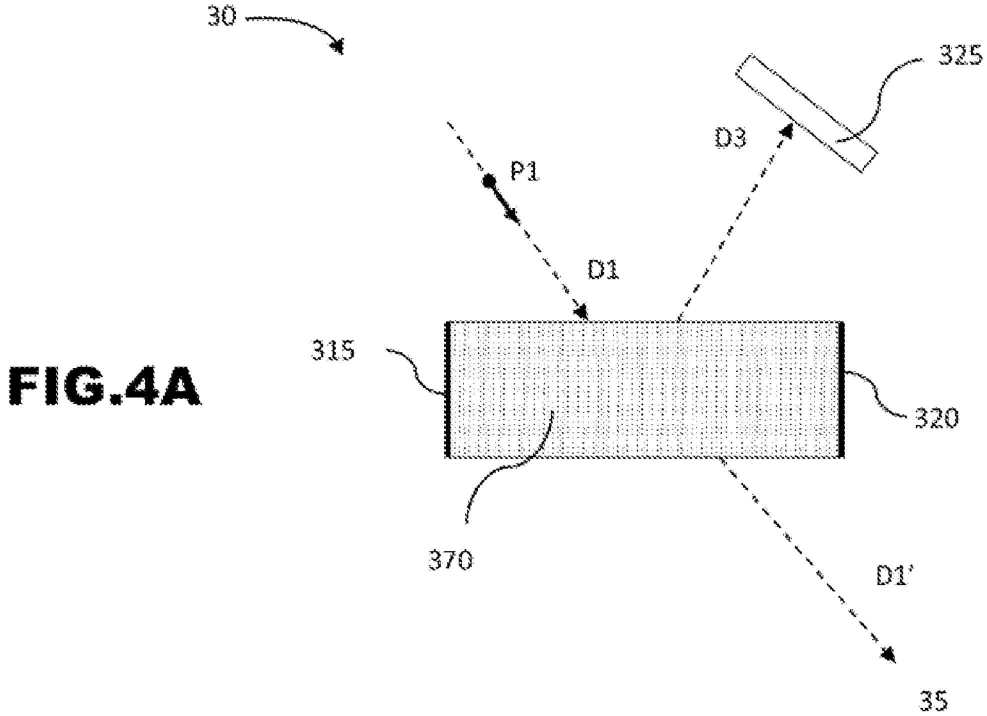
Figure 4B:
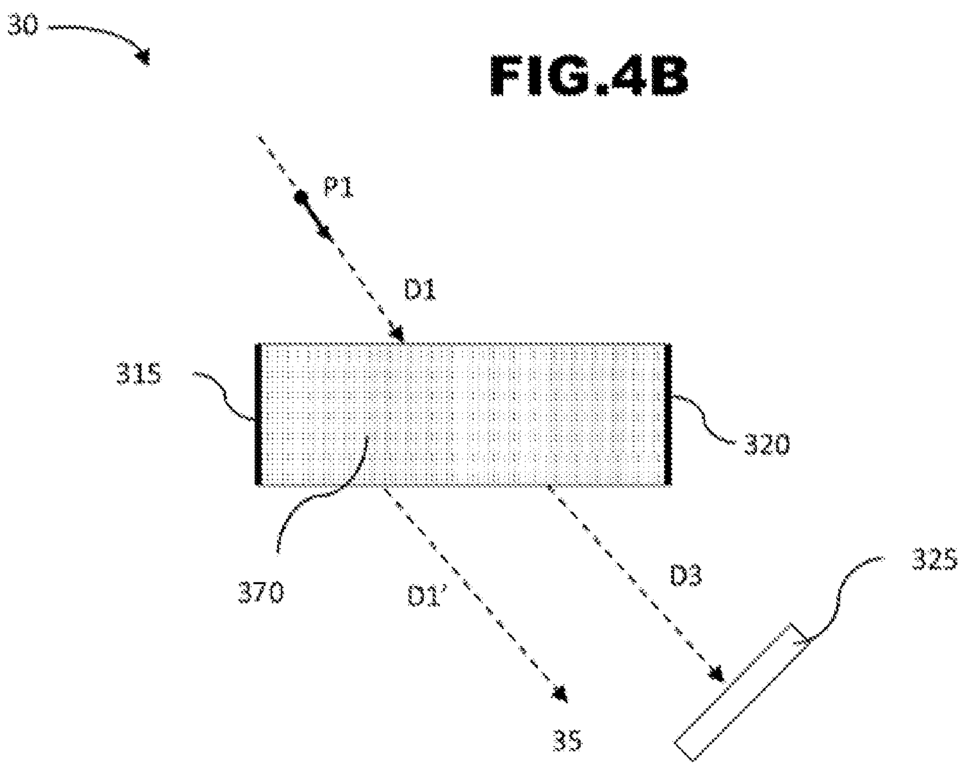
Figure 4C:
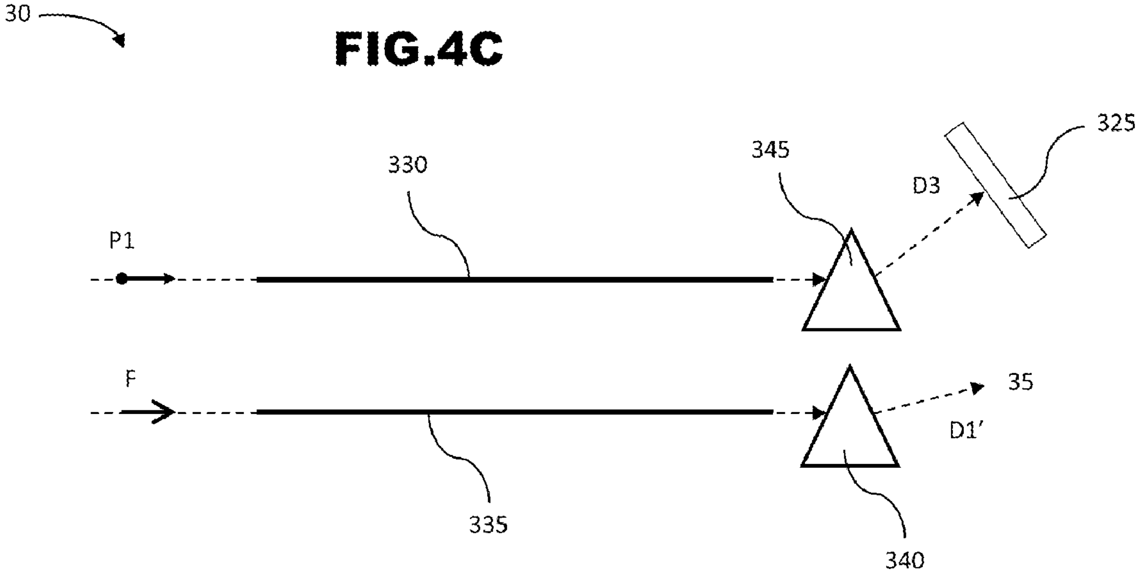
Figure 5A:
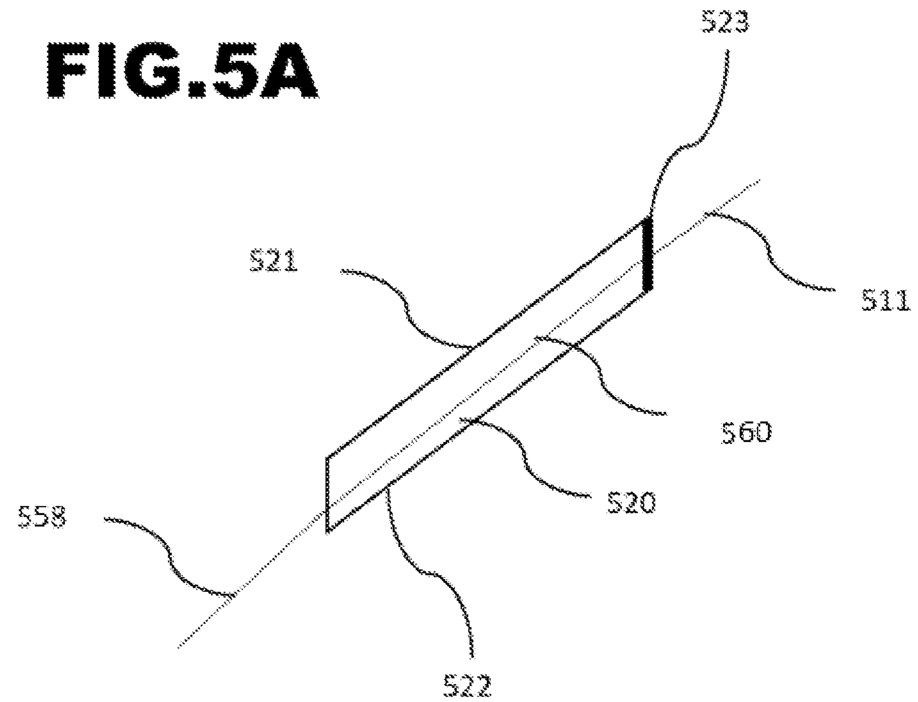
Figure 5B:
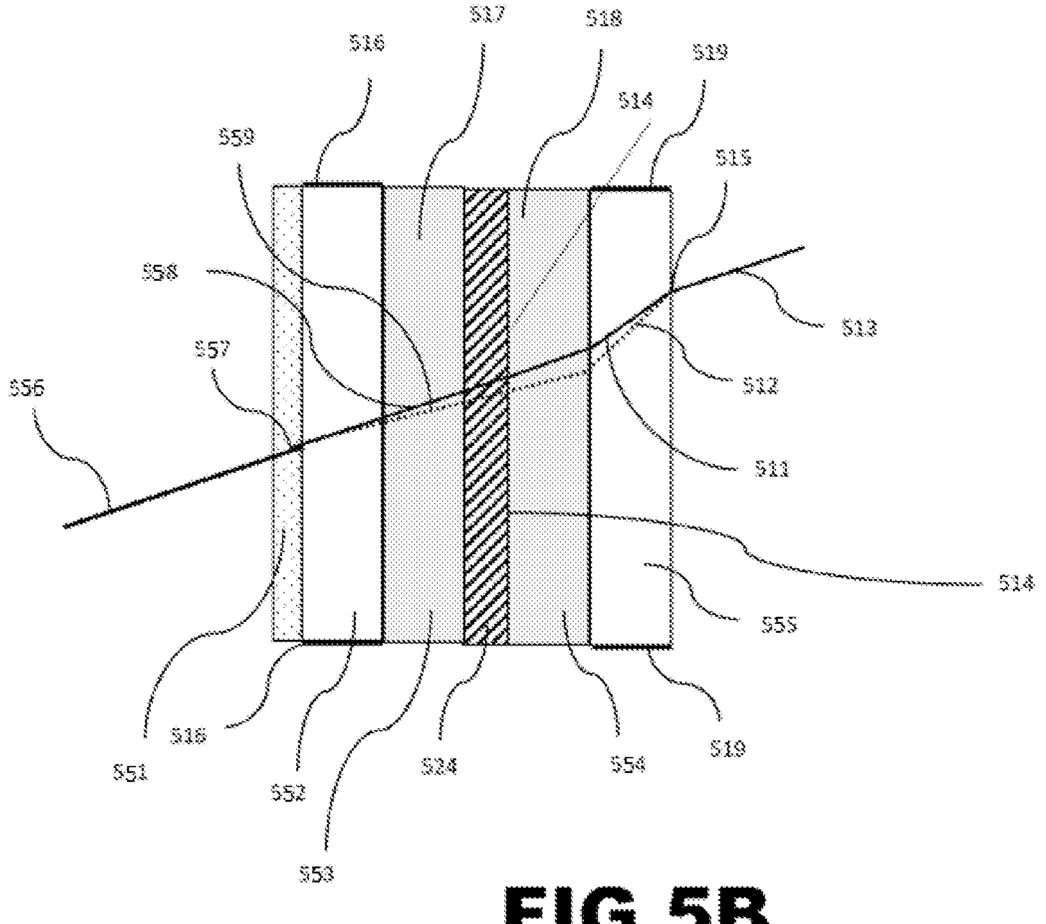
Figure 6:
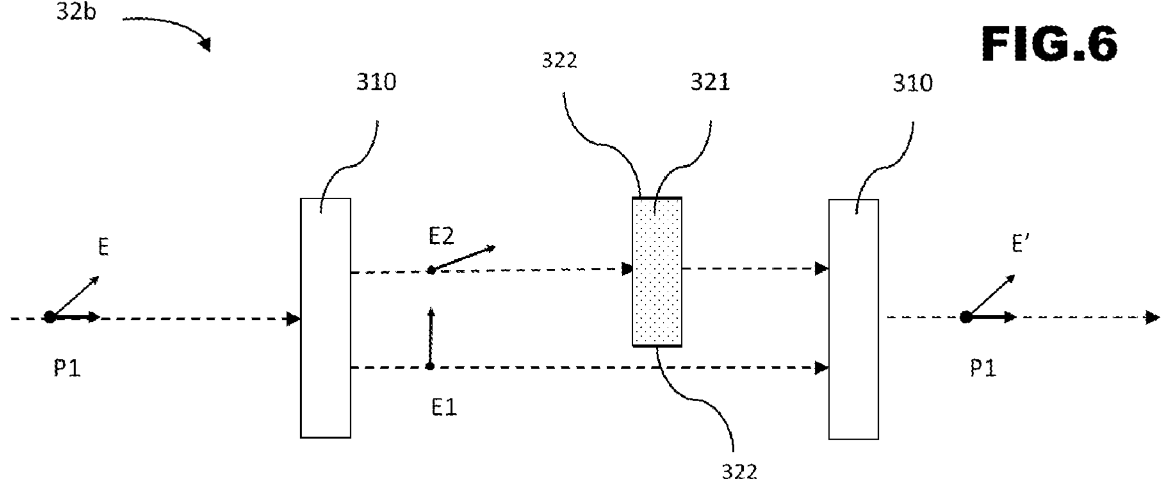
Figure 7:
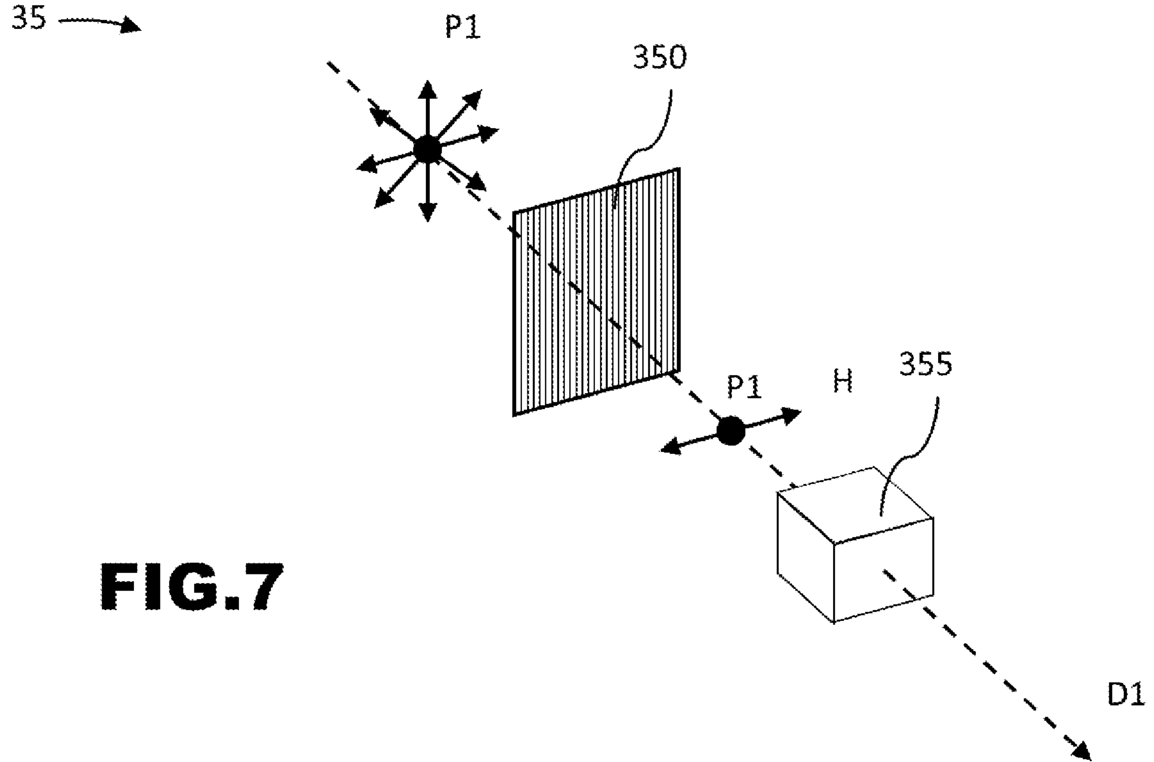
Figure 10A:
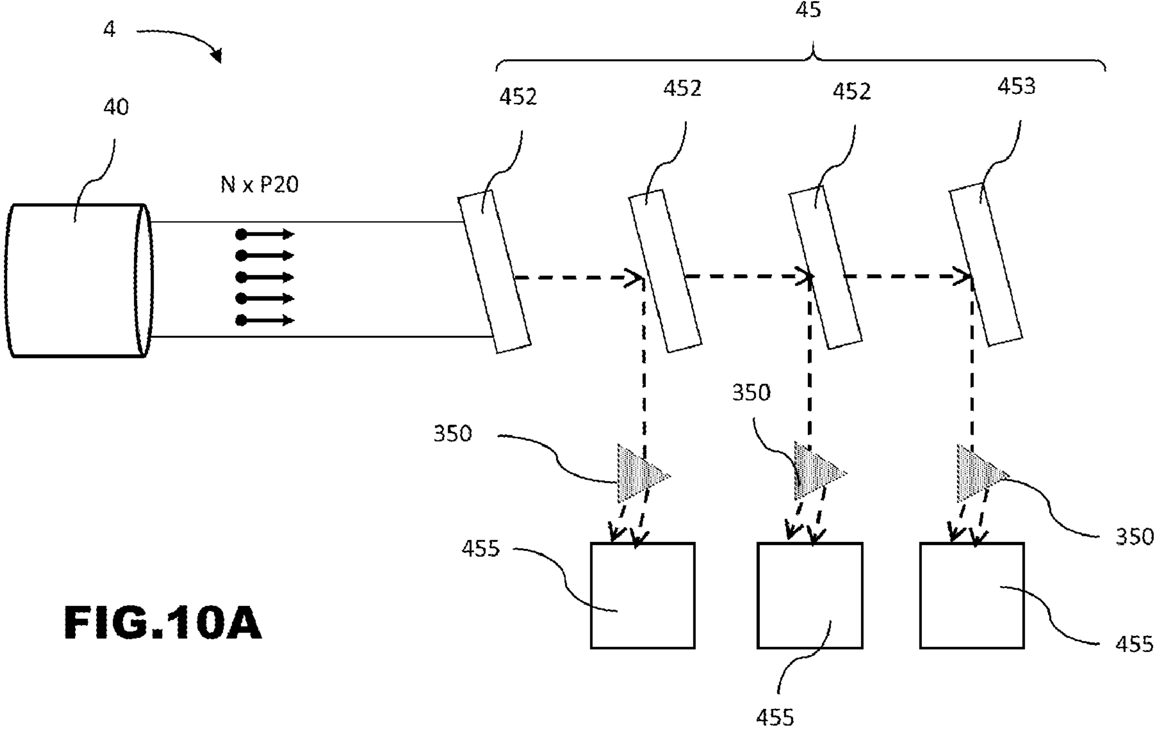
Figure 10B:
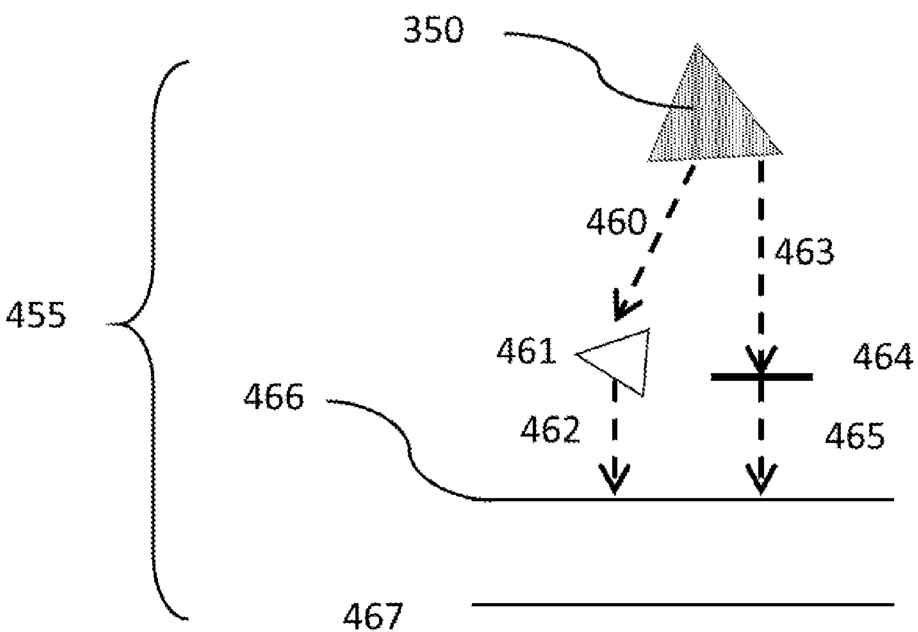
Figure 11A:
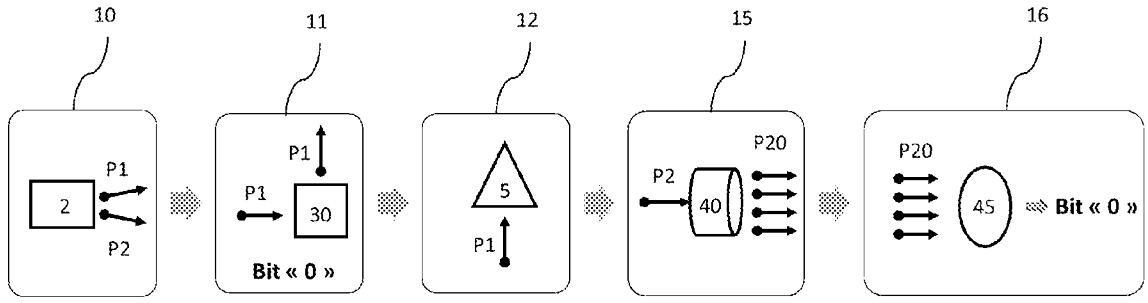
Figure 11B:
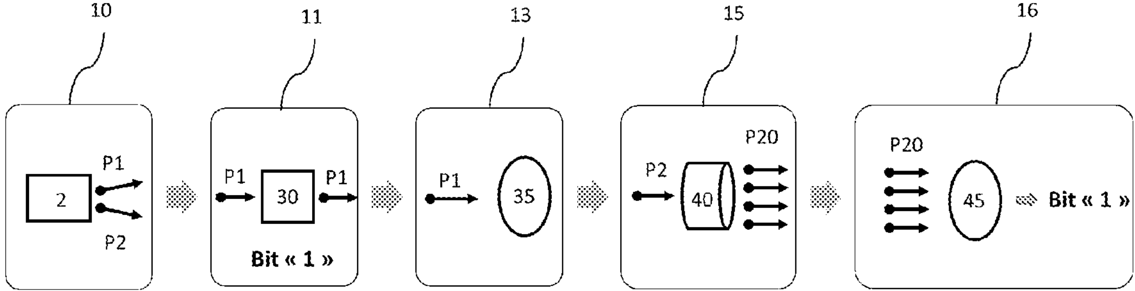
Figure 12:
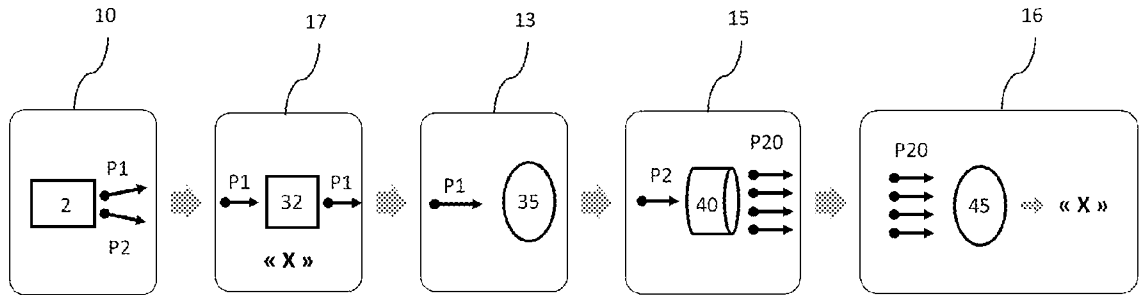
Figure 13:
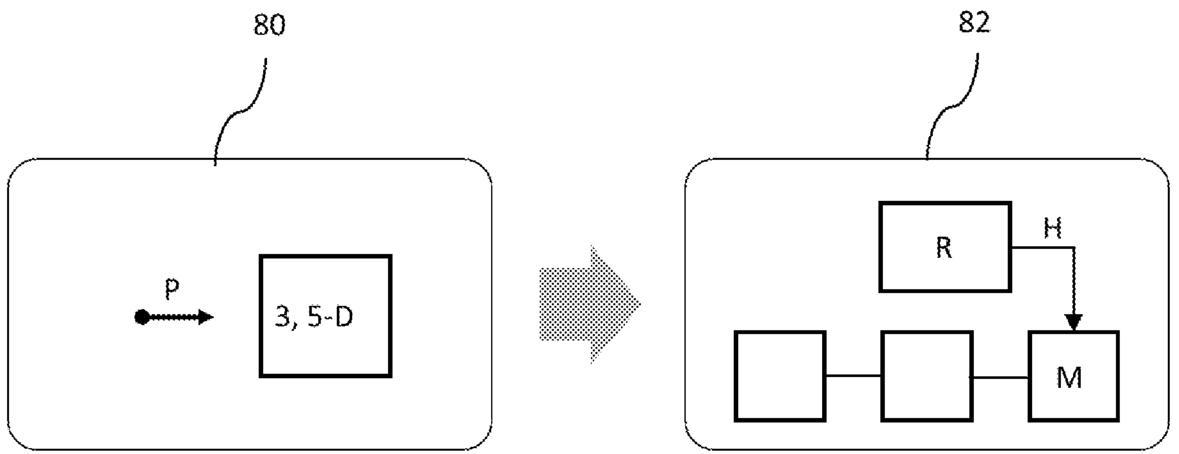
Figure 14:
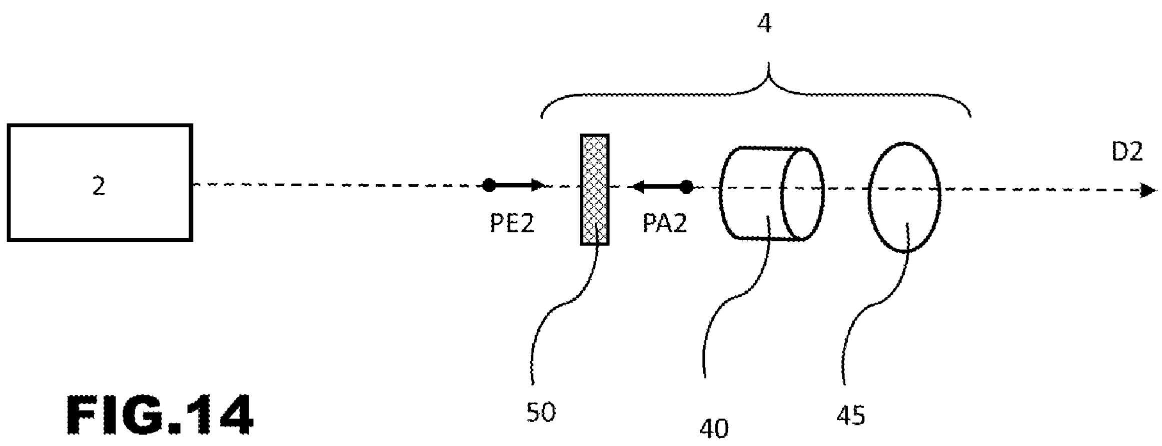
Figure 15:
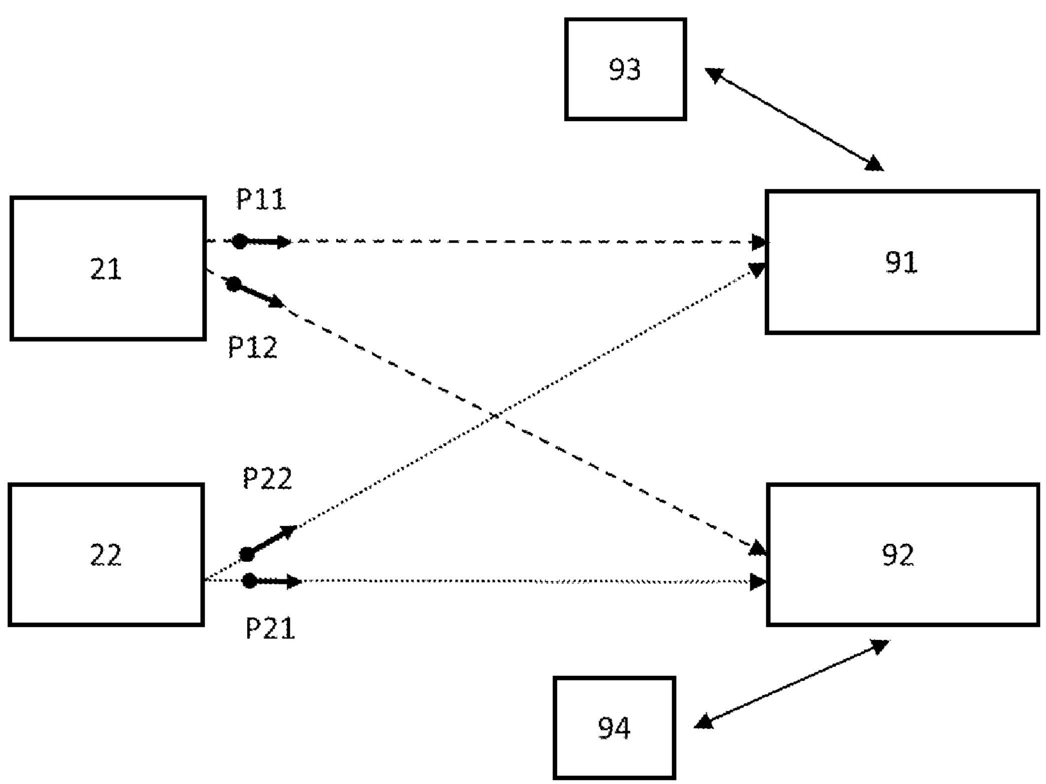
Figure 16:
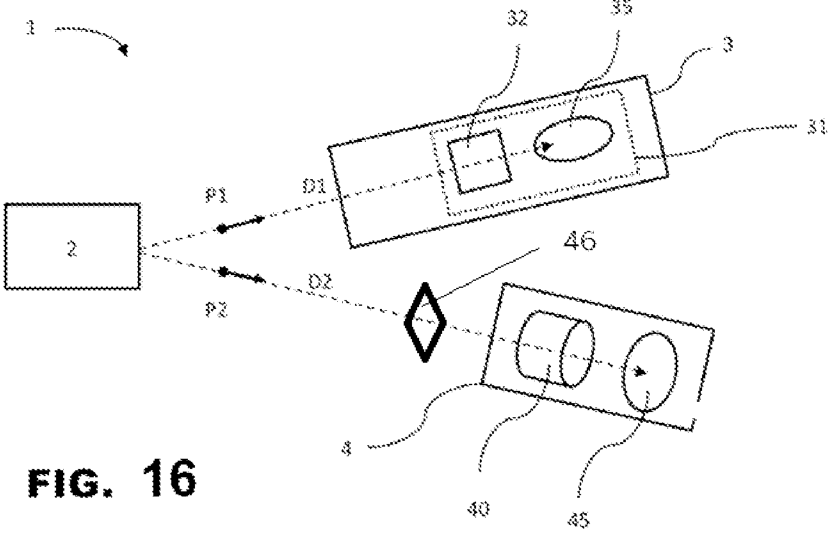
Figure 17:
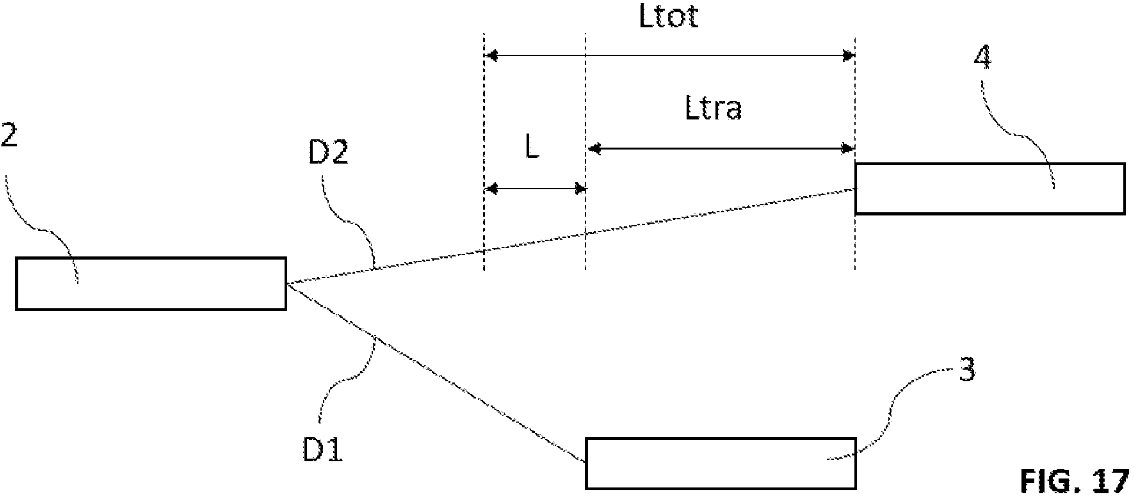
Figure 18:
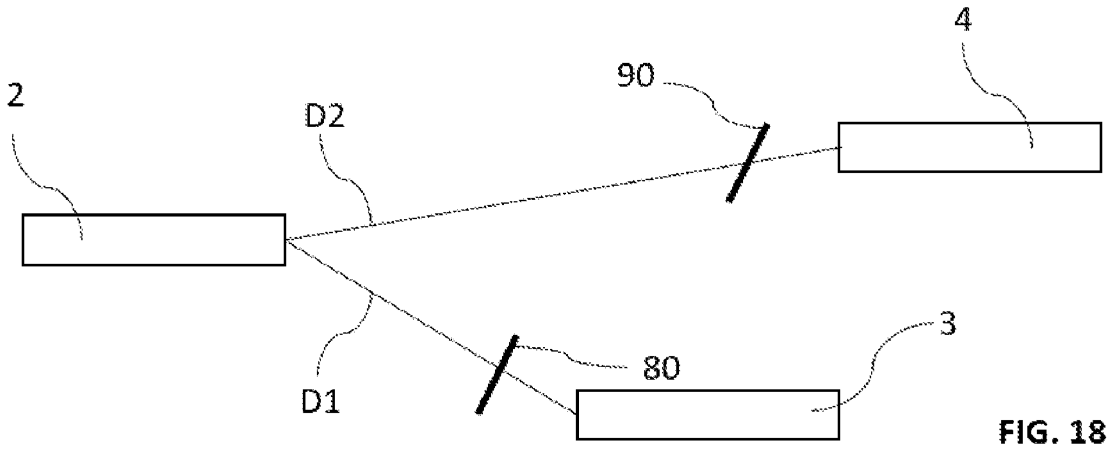
Figure 19:
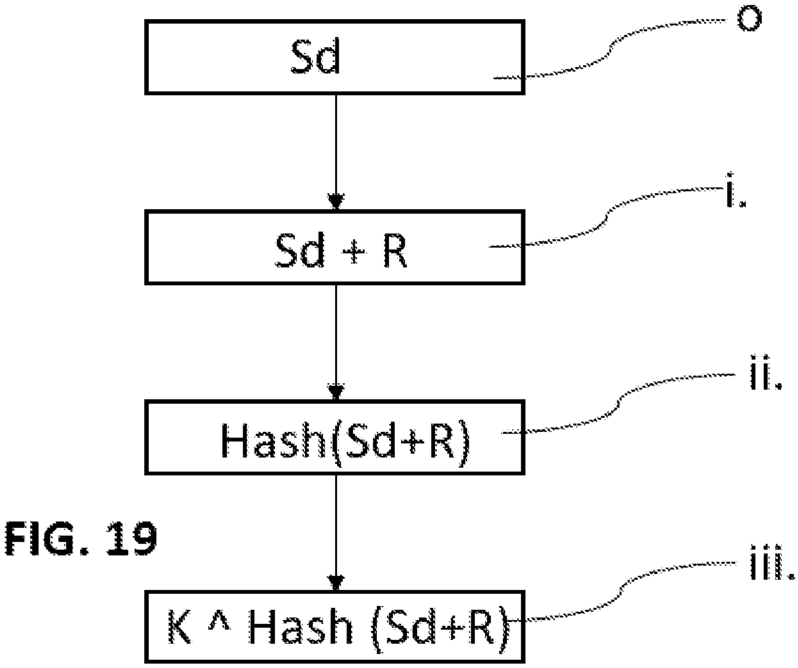

The invention will be understandable more clearly on reading the following detailed description of nonlimiting exemplary embodiments thereof, and on studying the appended drawing in which:

FIG. 1A partially and schematically represents a quantum communication system according to the invention, FIG. 1B partially and schematically represents another quantum communication system according to the invention, FIG. 2A partially and schematically represents a linearly polarized photon, FIG. 2B partially and schematically represents a circularly polarized photon, FIG. 3 partially and schematically represents details of the transmission of photons from the emitter to the receivers, FIG. 4A partially and schematically represents an example of an optical selector according to the invention, FIG. 4B partially and schematically represents a variant of the selector of FIG. 4A, FIG. 4C partially and schematically represents another example of an optical selector according to the invention, FIG. 5A and FIG. 5B schematically represent an example of a polarization direction modifier, comprising quarter-wave plates, FIG. 5B schematically represents another example of a polarization direction modifier, comprising a chiral material, FIG. 6 schematically represents an example of a polarization phase modifier, FIG. 7 partially and schematically represents an example of an instrument for absorbing a linearly polarized photon, FIG. 8 partially and schematically represents another example of an instrument for absorbing a linearly polarized photon, FIG. 9 partially and schematically represents an example of a receiver of the second photon, comprising a doped-fiber amplifier, FIG. 10A partially and schematically represents an example of a measuring instrument of the second receiver, comprising a succession of semi-reflective plates, FIG. 10B partially and schematically represents an example of a Young's interferometer used for the measuring instrument of the second receiver, FIG. 11A is a block diagram partially illustrating an example of the operation of a quantum communication system in order to transmit a bit 0, FIG. 11B is a block diagram partially illustrating an example of the operation of a quantum communication system in order to transmit a bit 1, FIG. 12 is a block diagram partially illustrating an example of the operation of a quantum communication system in order to transmit a series of discrete values, FIG. 13 is a block diagram partially illustrating an example of a method for timestamping the arrival of a photon in a receiver, FIG. 14 partially and schematically illustrates the possibility of placing an "antinoise" device in front of the amplifier, FIG. 15 partially and schematically represents the possibility of using the system according to the invention in order to establish bidirectional communication between two locations, FIG. 16 illustrates a variant of implementation of a quantum communication system according to the invention, FIG. 17 schematically illustrates a physical protection of the quantum communication system according to the invention, FIG. 18 schematically illustrates an optical protection of the entangled photons of the quantum communication system according to the invention, FIG. 19 schematically illustrates an example of a method calculating a hash of a dataset.

DESCRIPTION DÉTAILLÉE

FIG. 1A illustrates a quantum communication system 1 according to the invention. The system comprises an emitter 2 emitting a pair of entangled photons (P1, P2), the first photon P1 propagating on a propagation path D1 and the second photon D2 propagating on a propagation path D2 different to the path D1. The photons P1 and P2 are emitted simultaneously.

Because of the nature of light and the wave-particle duality of a photon, the terms "wave", "photon" and "particle" are used interchangeably below in order to denote the product emitted by the emitter 2.

The terms "measuring instrument" and "absorption instrument" are used interchangeably to denote an instrument that absorbs a photon according to a certain polarization.

The system 1 comprises a first receiver 3, located on the propagation path D1 of the first photon P1, and a second receiver 4 located on the propagation path D2 of the second photon P2.

The receiver 3 is closer to the emitter 2 than the receiver 4 is, so that the photon P1 reaches it before the photon P2 reaches the receiver 4. The photon P2 reaches for example the receiver 4 after an additional travel time $t_{tra}$ corresponding to an additional travel path Ltra.

In the example considered, the receiver 3 comprises a complex absorber 31 comprising a polarization modifier 32 and an absorption instrument 35.

The complex absorber 31 is configured in order to absorb the photon in a polarization state selected from among a plurality of pairs of different complementary polarizations, preferably at least three pairs.

The polarization modifier 31 is configured in order to transmit the photon P1 according to the selected pair of complementary polarizations, and the absorption instrument 35 makes it possible to determine which of the two states of the pair the photon P1 is in. Before entering the absorption instrument 35, the polarization state of the photon P1 is a superposition of the two states of the selected pair, weighted with certain probabilities, for example equiprobably.

FIG. 1B illustrates another example of a quantum communication system 1 according to the invention. In this example, the receiver 3 comprises two measuring instruments 35 arranged in order to measure the quantum state of the first photon P1, and an optical selector 30 arranged upstream of the measuring instruments 35 and configured in order to send the first photon P1 either toward a birefringent prism 36 which leads the photon, depending on the linear direction of its polarization, on paths D1' or D1" then toward one or other of the measuring instruments 35, or prevents it from being measured, for example by reflecting it onto a propagation path D3 different to the path D1.

The direction D3 is, in particular, selected in such a way that the photon P1 is not absorbed before its entangled photon is multiplied at the second receiver 4.

The system 1 preferably comprises, as illustrated, a device 5 for protecting the quantum state of a photon, which is arranged in proximity to the receiver 3, in particular on the propagation path D3 in the example considered.

This device makes it possible, for example, to "trap" the photon P1 in the event that it is reflected by the optical selector 30 onto the path D3, for example in order to prevent it from being measured or absorbed at least until the second photon P2 has reached the second receiver 4. A 5D photon detector (not represented) may be placed at the end of the device 5 in order to detect the photons which have been captured therein, after their entangled photons have reached the second receiver.

The second receiver 4 comprises an optical amplifier 40 making it possible to multiply the second photon P2 while preserving its polarization, and a measuring instrument 45 making it possible to measure the average polarization of the multiplied photons.

The transmission of the photons P1 and P2 may take place in various ways, and in various media. The photons propagate, for example, in an optical fiber or a waveguide, or freely in space, the space being empty or filled with a gas.

The photons may pass through a plurality of media having different refractive indices. For example, antireflection plates may be inserted between two media being passed through, as appropriate, in order to prevent undesired optical phenomena, in particular Fresnel reflection of the waves emitted by the emitter 2.

The emitter 2 comprises, for example, one or more lenses selected with a sufficient size for the photons to reach their respective receiver with little diffraction, for example allowing at least 99.99% of the emitted wave to reach the receiver.

The emitter 2 may furthermore comprise a system, in particular an electronic device, making it possible to adjust the initial directions in which the photons P1 and P2 are respectively emitted.

The adjustment may, in particular, take account of the different refractive indices of the media passed through, and the modification of the trajectory of the photons which may result therefrom, for example for a photon emitted from space which enters the atmosphere.

The wavelength of the emitted wave is, for example, selected according to the medium or media to be passed through; for example, photons in the infrared range will preferably be used when they have to transit through the atmosphere or air.

The emitter 2 generates, for example, pairs of entangled photons by using the method of spontaneous parametric down-conversion (SPDC). The emitter 2 is, for example, configured in order to emit on average less than one pair per unit time, for example one pair per nanosecond, which corresponds to a photon transmission frequency of 1 GHz.

When they are emitted, the photons P are for example linearly polarized, that is to say the corresponding electromagnetic wave has an electric field whose direction is perpendicular to its propagation direction D. As appropriate, the polarization of the photons may be vertical V or horizontal H, as illustrated in FIG. 2A.

The quantum state corresponding to the polarization of the photons is sometimes indeterminate so long as it has not been measured or absorbed. Before being measured, the quantum state of the photon is therefore sometimes considered as the superposition of the possible states, namely in the example considered as the superposition of a polarization at an angle of 45° and a polarization at an angle of −45°.

In the variant illustrated in FIG. 2B, photons P are circularly polarized when they are emitted, that is to say the direction of the corresponding electric field changes in a rotational movement while its norm remains constant.

As appropriate, the polarization of the photons is defined by the sense of rotation of the electric field, either a clockwise sense C1 or a counterclockwise sense C2. Before being measured, linearly polarized photons are in an indeterminate quantum state considered as the superposition of two circular polarization states with opposite rotation senses.

In certain cases, two quarter-wave plates 6 and 8 may be introduced on the propagation paths of the photons, between the emitter 2 and the receivers 3 and/or 4, as illustrated in FIG. 3.

Depending on its orientation, the plate 6 converts for example the linear polarization of a photon into circular polarization by advancing or retarding the electromagnetic waves propagating along an axis perpendicular to the ordinary axis of the crystal with an electric field perpendicular to the same axis, with respect to the wave having an electric field parallel to said ordinary axis.

The photons emerging from the plate 6 are, for example, transmitted by an optical fiber 7 toward another quarter-wave plate, which converts the circularly polarized fields into linearly polarized fields, before propagating toward the receiver 3 or 4.

This conversion of the polarization of the emitted photons makes it possible, in particular, not to have to take the direction of the polarization of the photons emitted by the emitter into consideration at the receivers.

The optical selector 30 may be produced in various ways, some examples of which are illustrated in FIGS. 4A to 4D.

The optical selector 30 comprises, for example, a controlled liquid-crystal mirror as illustrated in FIG. 4A, comprising a plate 370 enclosing liquid crystals. For example, electrodes 315 and 320 are placed on opposite sides of the plate 370 in order to subject the liquid crystals to an electric field, making it possible to control its refractive index $n_C$.

Depending on the refractive index $n_C$, the incident photon P1 may be reflected onto a propagation path D3, or it may pass through the plate 370 and be transmitted on a propagation path D1', which may be identical or different to the path D1, toward the measuring instrument 35.

In a variant which is illustrated in FIG. 4B, the photon P1 passes through the liquid-crystal plate 370 and emerges along D3 or D1', the directions D1, D1' and D3 being parallel in the example considered.

A mirror 325, in particular a Bragg mirror, may be placed on the propagation axis D3 in order to reflect the photon in another direction, for example toward the protection device 5.

Antireflection plates may advantageously be placed on each of the faces of the plate 370 and adjusted according to the entry and exit angles of the photon when the latter passes through it.

In the variant illustrated in FIG. 4C, the optical selector 30 is a mirror controlled by nonlinear fibers. It comprises two optical fibers 330 and 335. The fiber 335 is, for example, formed from a nonlinear material.

On its arrival at the first receiver, the first photon P1 enters the fiber 330. The selection may be made to illuminate the fiber 335 simultaneously with a light signal F, also referred to as a "control signal".

The signal F is a high-intensity light wave, for example emitted by a laser, with a wavelength different to that of the photon P1.

If the fiber 335 is illuminated by the signal F, the photon P1 remains in the fiber 330 before, for example, passing at the fiber exit through a prism 345 arranged on a propagation path D3. In a similar way to that which has been described above, a mirror 325, in particular a Bragg mirror, may be placed on the propagation axis D3 in order to reflect the photon in a desired direction, for example toward the protection device 5, or straight back into the fiber 330.

If the fiber 335 is not illuminated by the signal F, the photon P1 is transmitted from the fiber 330 to the fiber 335. The photon P1 emerges from the fiber 335 and, for example, passes through a prism 340 before being transmitted toward the measuring instrument 35, for example. The prism 340 preferably consists of a dispersive material allowing the illumination light to be made to emerge through a different location and in a direction different to that of the photon. A Bragg mirror (not represented) that returns only said illumination light and allows the photon to pass through may be placed between the fiber 335 and the prism 340, for example in order to reflect said illumination light in a direction other than toward the prism 340, or even into the fiber.

Antireflection plates (not represented) may be placed at the entry and exit of the prisms 340 and 345 and adjusted to the wavelength of the photon P1.

Various ways of producing the polarization modifier 32 of the system of FIG. 1B will now be described.

The polarization modifier 32 preferably comprises a polarization direction modifier 32*a* arranged upstream of a phase modifier 32*b*.

In a first exemplary embodiment of polarization direction modification, the polarization direction modifier 32*a* comprises a stack of plates 560, in particular quarter-wave plates, orientated differently with respect to one another, as illustrated in FIG. 5A, so that a circular wave 558 entering one of these quarter-wave plates emerges as a wave 511 polarized linearly along a direction associated with said plate.

These plates may be designed in order to operate with waves 558 that enter them with a direction parallel to the bisector of their edges 521 and 522. These plates are preferably composed of uniaxial birefringent crystals, for example rutile. This birefringent crystal may form their entire mass or may be concentrated on a slice, for example on one of the edges 523 through which the wave 558 passes, as illustrated in FIG. 5A.

These plates may be juxtaposed with one another and form a structure 524, as illustrated in FIG. 5B, so that the emerging waves 511 or 512 have a linear polarization whose electric field direction depends on the place of entry into the assembly 524 of two waves 558 or 559 polarized circularly and with a direction parallel to the bisector of the edges 521 and 522.

Thus, a wave 556 with a determined direction and linear polarization entering the quarter-wave plate 551 passes through it along the direction 557 and becomes circularly polarized therein before entering a crystal 552 whose refractive index is adjustable, for example under the effect of an electric field generated by electrodes 516, then preferably enters another crystal 553 whose refractive index is also adjustable, for example under the effect of an electric field generated by electrodes 517, which generate an electric field perpendicular to the field generated by the electrodes 516.

Circularly polarized waves 558 and 559 then emerge from the crystal 553 and enter the assembly 524 at different places according to the selection of the refractive index imposed on the crystal 553. The direction of the light ray being different depending on these places, the direction of the edges 520 and 521 is preferably different for each element 560 of the assembly 524.

On the diagram illustrated in FIG. 5B, the waves 511 and 512 are therefore two possibilities for the light ray to pass through the assembly 524. These waves emerge from the assembly 524 polarized linearly along different directions and having the same propagation direction, but at different places on the border 514 of the assembly 524. They enter another crystal 554, the refractive index of which is electrically adjustable by electrodes 518, then preferably yet another crystal 555, the refractive index of which is also adjustable by electrodes 519, which create an electric field perpendicular to the field created by the electrodes 518, the voltages of which are adjusted as a function of the refractive index selected for the crystals 552 and 553 so that all the light waves emerge from the crystal 555 as a wave 513 with the same direction at the same location 515.

The crystals 552 553, 554 and 555 are, for example, Merck E7 liquid crystals, at the terminals of which the electrodes apply voltages of between 0 and 5000 V, for example, if the distance between the electrodes of each of the pairs is 5 mm, making it possible to vary their refractive indices between 1.5 and 1.67. The electrodes are preferably covered with a dielectric film. These refractive indices modified by the electric fields may be different depending on the relative direction of the electric field of the light and the direction of the electric field, the application of successive perpendicular electrical voltages making it possible to modify the refractive index for each of the two components of said light, the latter being the superposition of the waves whose electric field is perpendicular to FIG. 5B and of the waves whose electric field is perpendicular to the propagation direction and in the plane of the FIGURE.

In a second exemplary embodiment (not represented) of the modification of the polarization direction, the wave polarized linearly along a determined direction enters a first quarter-wave plate which converts its polarization into circular polarization, then a second quarter-wave plate which converts this circular polarization into a linear polarization along an adjustable direction dependent on the orientation of this second quarter-wave plate. The orientation of the second quarter-wave plate is obtained, for example, by mechanical slaving to a sensor or to an electrically regulated device making it possible to rotate it, for example by friction on an axle set in movement by a piezoelectric material or by an electric motor device, for example operating with direct current.

Figure 5C:
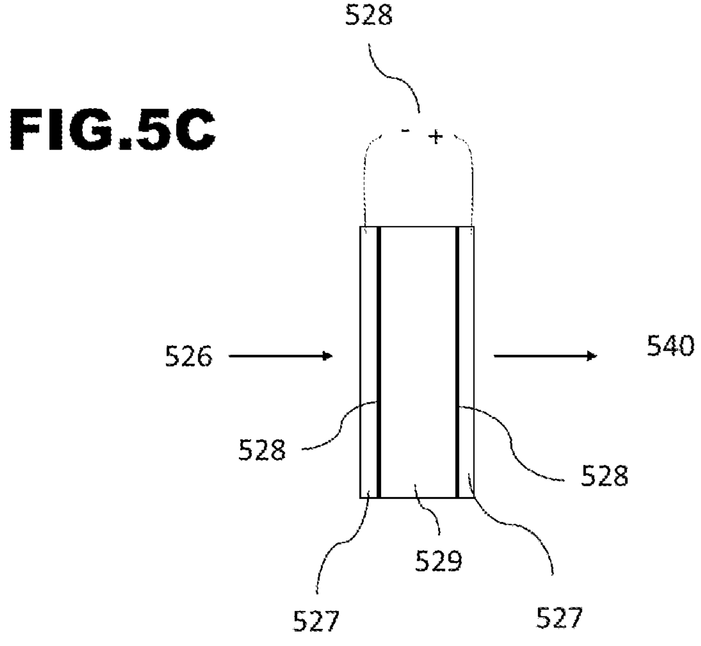

In a third example, illustrated in FIG. 5C, liquid crystals are used in order to control the rotation of the linear electric field of the incident photons 526 polarized linearly along the same polarization direction, which start for example by passing, preferably perpendicularly, through one of two transparent 0.2 μm electrodes 527 which is coated on one of its faces 528 with a material that orientates the liquid-crystal particles 529 adjacent to said face 527 in the direction of the polarization of the incident photons 526, then passing through the liquid-crystal 529 over 2 μm before passing through the second transparent electrode 527 whose face 528, preferably parallel to the first electrode, is also coated with a material making it possible to align the liquid crystals but in a direction perpendicular to the direction imposed by the coating of the first electrode. The direction of the liquid crystals between the two electrodes is thus gradually modified from 0° to, for example, 600 with respect to their initial orientation. The application of an electrical voltage between, for example, 0 and 1 V gradually reorientates the liquid crystals in order to impose on them a direction in the axis of the propagation direction of the photons, thus gradually reducing the refractive index difference of the liquid crystals between the two polarizations perpendicular to the movement of the photons and the rotating power of the device. This device therefore makes it possible to select the exit direction of the polarization of the incident photon continuously between 0 and 60°.

Devices such as the one illustrated in FIG. 5B are advantageously used in a device similar to the one described above and illustrated in FIG. 5A, for example placed between the plates 524 and 554, each of for example 4 elements 560 making it possible to place the linear polarization of an incident photon in one of four precise directions, for example −90°, −45°, 0° and +45°, then each of the subsequently placed devices described in FIG. 5B, which are preferably aligned with the propagation direction of the photons emerging from the devices 560 that precede them, making it possible to add a rotation by any angle between, for example, 0 and 450 to this rotation.

FIG. 6 illustrates a polarization phase modifier 32*b* according to the invention. The phase modifier 32*b* comprises a first birefringent plate or prism 370 arranged in order to split the incident photon P1 with a polarization field E into two electromagnetic waves with a linear polarization $E_1$ and $E_2$ on two different axes $x_1$ and $x_2$.

A retardation plate 321 with a variable refractive index, for example comprising a Pockels cell such as lithium niobate, regulated by electrodes 322 or a nonlinear material, is arranged on the second axis $x_2$ so as to make the wave $E_2$ orientated along the second axis $x_2$ acquire a predetermined phase shift with respect to the wave $E_1$ orientated along the second axis $x_1$.

Another birefringent plate 370, for example consisting of paratellurite, is arranged at the exit of the phase modifier 32*b*, making it possible to combine on the same axis x the two waves whose polarization fields $E_1$ and $E_2$ are perpendicular into one wave or photon P1 with a field E' that has acquired a phase shift with respect to the field E. Alternatively, in order to profit from the different modification of the refractive index of the crystal according to the direction of the electric field of the light relative to the direction of the electric field modifying the refractive index, a simple Pockels cell 321 may be used with the electrodes 322 but without the plates 370.

The measuring instruments 35 of the first receiver 3 may be of varied types and comprise various elements. The latter depend, in particular, on the nature of the polarization of the photon P1 when it is emitted by the emitter 2. Some examples are illustrated in FIGS. 7 and 8 and described below.

In the example illustrated in FIG. 7, the measuring instrument 35 comprises a polarizing filter 350 arranged on the propagation path D1 of the photon P1 and a photon detector 355 arranged on the same propagation path, downstream of the filter 350.

The polarizing filter 350 allows only the photons that have a certain linear polarization to pass through, and absorbs those whose polarization is perpendicular thereto. It therefore makes it possible to select the photons having a linear polarization with a certain direction.

In the example considered, the polarizing filter 350 is a grille formed by vertical wires, for example metal wires. It allows only the photons that have a horizontal linear polarization H to pass through.

In one variant, illustrated in FIG. 8, the measuring instrument 35 comprises an anisotropic panel 360, for example a birefringent plate, a birefringent prism or two birefringent prisms attached to one another. The panel is, for example, made of beta barium borate ($BaB_2O_4$, BBO).

The photon P1 whose quantum state is intended to be measured reaches the panel 360 on an incident propagation path D1 and is transmitted on one of two propagation paths D11 or D12, depending for example on whether its polarization is in the plane of the plate 360 (that is to say perpendicular to the plane of FIG. 8) or normal to the plane of the plate 360.

The measuring instrument 35 furthermore comprises two detectors 355, each placed on a propagation path D11 or D12 of the photon P1.

In this example, and in contrast to a polarizing filter, all the photons can be detected by the detectors 355, regardless of their polarization.

In some embodiments, a quarter-wave plate is placed upstream of the anisotropic plate 360 in order to convert a circular polarization of a photon into a linear polarization, and thus to detect the sense of the rotation of a circularly polarized photon.

The second receiver 4 may comprise various types of optical amplifier 40 and measuring instrument 45.

For example, a doped-fiber amplifier as illustrated in FIG. 9 is used.

In this example, the amplifier 40 comprises a fiber 400, in particular a fiber made of nonlinear material, into which the second photon P2 is introduced after having passed through a dichroic prism 451 when it reaches the receiver 4.

A control electromagnetic wave F used to supply energy and multiply the photon P2 is introduced through a fiber 450 into the same dichroic prism 451 at a point and with a direction such that it emerges from the fiber 400 just like the photon P2, the photon P2 and the control wave F having different wavelengths.

The control wave F preferably has a high luminous intensity and preferably a wavelength shorter than that of the photon P2.

While it is passing through the fiber 400, and under the effect of the light flux F, the photon P2 is multiplied into N photons P20, then these N photons and the flux F pass through a second dichroic prism 452 from which they emerge in different directions. The N photons are then advantageously directed toward a measuring instrument 45 making it possible to determine the polarization of the light flux, exemplary embodiments of which are given in FIGS. 10A and 10B.

The information transmitted by the first receiver can be deduced from the measurements of the measuring instrument 45 because the amplification of the photon P2 by the device 40 preserves its polarization.

In particular, if the photon P2 is the entangled photon of a photon P1 absorbed in one of two complementary polarizations known to the first receiver, the N multiplied photons P20 are measured with a polarization which can be deduced from the absorption polarization of the photon P1 by using the Jones matrix calculated during a calibration, as described above.

The measuring instrument 45 may comprise a succession of semi-reflective plates 452 and a mirror 453, as illustrated in FIG. 10A. The plates 452 and the mirror 453 direct the multiplied photons P20, which form a light flux, for example toward prisms 350 made of birefringent materials, preferably with an equal intensity. The filters 350 split the light flux into two orthogonally polarized light fluxes, so that the detectors 455 can either determine the intensity of said flux along each of the orthogonal directions or determine the phase shift between the two orthogonal components of the flux, for example by means of a Michelson interferometer or a Young's slit interferometer.

The interferometers are preferably arranged so that the light paths of the two orthogonal components are identical, the light flux originating from the multiplication of a single photon being very brief. The use of a plurality of pairs of orthogonal directions, for example offset by 45° from one another, advantageously makes it possible to measure the polarization, that is to say the direction of the polarization as well as the phase shift between the two directions, several times, thus allowing greater accuracy in the measurement.

FIG. 10B represents an example of such a Young's slit interferometer. Two waves 460 and 463 come from the prism 350. The wave 460 passes, for example, through a prism 461 which restores its propagation direction so that at 462 it becomes parallel to the wave 463. The wave 463 passes, for example, through a half-wave plate making it possible to align the electric field of said wave 465 with that of the wave 462. The waves 462 and 465 then pass through two holes made in a screen 466 before interfering with one another in order to form fringes on a screen 467, which is observed by a camera or is equipped with photosensitive sensors making it possible to determine the position of the brightest fringe on said screen 467.

Items of information, in particular items of information of the binary type, can be transmitted between the receivers 3 and 4 of a system 1 such as the one described in FIG. 1*i*, for example by following the steps illustrated in FIGS. 11A and 11B.

The correspondence protocol between the items of information to be transmitted, for example between sending a bit "0" or a bit "1" and the measurement or lack of measurement of the first photon P1, is determined before the start of transmission.

By way of example, the selection is made below not to measure the first photon P1 in order to transmit a "0" and to measure it in order to transmit a "1". Of course, the reverse choice or any other suitable correspondence would also be valid.

In step 10, two entangled photons P1 and P2 are emitted simultaneously from an emitter 2 toward receivers 3 and 4, respectively, the receiver 3 being placed closer to the emitter 2 than the receiver 4 is, as described above.

The emitted photons P1 and P2 have an indeterminate quantum state in a predetermined pair of complementary polarizations, for example a polarization at 450 if they are linearly polarized (the complementary polarizations being 0° and 90°).

In step 11, the photon P1 reaches the optical selector 30 of the receiver 3.

If a bit "0" is intended to be transmitted, the photon P1 is for example reflected by the optical selector on a perpendicular path in the example illustrated in FIG. 11A (although any other path as possible) so that it cannot reach the measuring instrument 35. The photon P1 may, in particular, be trapped in step 12 in a device 5 for protecting its quantum state, in order to avoid its absorption, at least so long as the second photon P2 has not reached the second receiver 4.

For example, the photon P1 preserves its polarization at 45°.

If a bit "1" is intended to be transmitted, the photon P1 passes for example through the optical selector 30 in order to be directed toward the measuring instrument 35, as illustrated in FIG. 11B.

The quantum state of the photon P1 is then measured by the measuring instrument 35 in step 13.

The photon P1 now has a determined quantum state, for example a vertical polarization (90°) or a horizontal polarization (0°). Instantaneously, the measurement carried out in step 13 projects the entangled photon P2 into a determined state.

In step 15, regardless of the item of information to be transmitted, the photon P2 reaches the optical amplifier 40 of the second receiver 4, where it is duplicated to form a flux of multiplied photons P20, each photon P20 having preserved the polarization of the photon P2.

In step 16, the polarization of the flux of photons P20 is measured by a measuring instrument 45.

If an intermediate result is obtained on average, for example a polarization at 45°, it is deduced therefrom that the first photon P1 has not been measured and a bit "0" is received.

If a quantum state corresponding to a measurement in the first receiver 3 is obtained, for example a vertical (90°) or horizontal (0°) polarization, it is deduced therefrom that the first photon P1 has been measured and a bit "1" is received.

Series of discrete values may furthermore be transmitted between the receivers 3 and 4 of a system 1 such as the one described in FIG. 1A, for example by following the steps illustrated in FIG. 12.

In step 10, two entangled photons P1 and P2 are emitted simultaneously from an emitter 2 toward receivers 3 and 4, respectively, for example with a linear polarization.

In step 17, the photon P1 reaches the polarization modifier 32, which converts the linear polarization of the photon P1 to a selected pair of complementary polarizations, the pair having been selected according to the Jones formalism and corresponding to a discrete value to be transmitted.

In step 13, the photon P1 is absorbed by the instrument 35 in one of the two complementary states of the selected pair, thereby projecting the entangled photon P2 into its complementary state.

The subsequent steps 15 and 17 are similar to those described above; the polarization of the photon P2 is measured by amplification then absorption, and the discrete value transmitted is deduced.

The invention is not limited to the measurement of a linear polarization of the photons. Other types of quantum state may be measured and/or other measuring means may be used, particularly measurements in other observable bases.

The photons P1 and P2 are for example emitted with a circular entangled polarization, and by measuring a linear polarization the measuring instrument 35 projects the photon P1, and by entanglement the photon P2, into a linear polarization basis.

As a variant, the photons P1 and P2 are emitted with a linear entangled polarization, and by measuring a circular polarization the measuring instrument 35 projects the photon P1, and by entanglement the photon P2, according to this observable basis.

In another example, the photons P1 and P2 are emitted with a vertical or horizontal entangled linear polarization, and the measuring instrument 35 measures a linear polarization at 45° or −45° to the vertical or the horizontal.

In one variant, the receiver 3 comprises two measuring instruments 35, one measuring a linear polarization and the other measuring a circular polarization. For example, the optical selector sends the photon P1 toward the first measuring instrument if a bit "1" is intended to be transmitted, toward the second measuring instrument if a bit "2" is intended to be transmitted, and prevents it from being measured if a bit "0" is intended to be measured.

In each of the examples above, the measuring instrument 45 of the second receiver 4 may be configured in order to detect whether or not the first photon P1 has been measured, and as appropriate, the polarization with which it has been measured at the first receiver.

Gyroscopes may furthermore be used at the emitter 2 and at the receivers 3 and 4 in order to determine the polarization direction of the photons P1 and P2, if they are emitted and transported toward the receivers with a linear polarization.

As mentioned above, the receivers 3 and 4 as well as the device 5 may be provided with devices for counting the photons during their absorption, and optionally after their waiting for the absorption of their entangled photon, which may be accompanied by timestamping of their arrival, as illustrated in FIG. 13. This can make it possible, for example, to control the correspondence between the pairs of entangled photons and the bits transmitted.

For example, each photon triggers the timestamping process by arriving at the receiver in step 80, in particular by reaching one of the measuring instruments 35 or 5D. Following this triggering event, in step 82 the receiver 3 copies, for example, the current time H on the clock of said receiver, for example written into a register R on a free memory register M, preferably after having subtracted the transit time of the photon in the waiting device 5 from the time of arrival at the 5D detector.

A similar device (not represented) may be arranged at the second receiver 4.

Preferably, the clocks making the timestamping which has just been described possible are synchronized for the two receivers 3 and 4, which optionally makes it possible to define photon processing time intervals that are common to the two receivers, and to process the "multiple" double pairs of photons emitted by the emitter 2.

The second receiver 4 may moreover comprise a switch 50 which is placed in front of the optical amplifier 40 and is configured in order to absorb or reflect the possible undesired photon or photons PE2 that reach the receiver 4 after the photon P2 within the same processing time interval, as represented in FIG. 14.

The switch 50 may furthermore absorb possible photons PA2 emitted by the amplifier 40 toward the emitter 2 during the amplification of the signal, or during the relaxation of molecules or atoms of the amplifier medium.

The switch 50 is, for example, regulated by an electronic mechanism (not represented), which is itself controlled by the measuring instruments 45 when they or one of them detects photons.

In some embodiments, the system according to the invention may comprise a plurality of emitters arranged differently relative to the receivers, particularly in order to establish bidirectional communication.

In the example illustrated in FIG. 15, the system 1 comprises two emitters 21 and 22, each emitting pairs of entangled photons toward two receivers 91 and 92.

The emitter 21 is closer to the receiver 91 than to the receiver 92, and the emitter 22 is closer to the receiver 92 than to the receiver 91. This arrangement makes it possible for the receivers 91 and 92 to communicate bidirectionally; the photon P11 emitted by the emitter 21 arrives first at the receiver 91, which may then act as the first receiver 3, that is to say it may transmit an item of information toward the receiver 92 which receives its entangled photon P12 and acts as the second receiver 4.

Conversely, the photon P21 emitted by the emitter 22 arrives first at the receiver 92, which this time makes it possible to transmit an item of information toward the receiver 91, which receives the entangled photon P22. The mechanism of transmitting information, in particular binary information, is for example similar to that which has been described above with reference to FIGS. 11 and 12.

Reflection devices 93 and 94 may be arranged in proximity to the receivers 91 and 92, respectively, in order to reflect the photons possibly reflected by the receivers 91 and 92.

With reference to FIG. 16 a variant of implementation of the invention will now be described, this variant being intended to verify that information transmitted by the emitter 2 has not been eavesdropped and where appropriate to generate a shared key for the exchange of information between the receivers 3 and 4, based on the transfer of information that it is known not to have been eavesdropped.

The system of FIG. 16 has been modified by adding at least one polarizing filter 46 before the entry of the receiver 4, this filter having a polarization direction that corresponds to the polarization direction expected for photons having travelled from the emitter to the receiver 4. The polarizing filter 46 is thus placed upstream of the change of photon polarization that is initiated by the receiver 3 sending information to the receiver 4.

The filter 46 prevents a fraudulent receiver from replacing the authentic receiver 4, from observing the exact polarization of the entangled photon after multiplication of said photon, then from sending to the authentic receiver 4 a fraudulent photon, instead of the authentic photon, which would necessarily be observed by the receiver 4 to have the same relative polarization as the authentic photon, because, on the one hand, if said photon is not entangled with another photon its polarization will not change after having passed through the filter 46 and therefore it will have the polarization imposed by the filter 46 and not the polarization of the authentic photon, and, on the other hand, if the fraudulent photon is entangled with another photon, called the second fraudulent photon, it is not possible to set the relative polarization of these fraudulent photons nor moreover to destroy or stop said fraudulent photon after it has passed through the filter 46, should the relative polarization of its entangled photon be verified inadequate, by a third piece of apparatus.

It is therefore extremely improbable for all or some of the photons of a group of entangled photons observed by both receivers 3 and 4 to have been observed elsewhere if their relative polarizations are still different.

It is possible to verify statistically the equality of the quantum state of the photons used to transmit the items of information that reach each of the two receivers 3 and 4, and to deduce therefrom that the probability that some of the photons have been observed is low, by applying the following method:

On reception of the photons by each of the receivers 3 and 4, the receivers note the time of reception and the exact polarization of the photons through use of photon detectors, and not solely the pair of complementary polarizations to which they belong. The times and polarizations of detected photons that are too close to one another to have their polarization or their arrival time measured independently are however, preferably, not noted, and the two receivers 3 and 4 preferably possess synchronized clocks.

After a determined number of photons bearing information I have been received, the second receiver 4 generates a message containing the precise time of detection and polarization of each of the photons these attributes of which were noted and that were considered to be transmitting information and therefore to belong to a group of NSP or more photons having a given polarization or indeed the complementary polarization of this polarization; NSP is defined above as the predetermined threshold number of photons received with a given polarization or its complementary polarization allowing the receipt of information to be identified.

This message is signed, preferably using the random hash technique described in patent application US 20210165914 A1, by the receiver 4, then sent to the receiver 3 with said signature, preferably employing a quantum transmission means such as described above, then the signature of the received message is verified, as is the correspondence of the relative polarizations of the photons received by the two receivers, for pairs of photons the two photons of which both reached the receivers. This information I may be declared to not have been eavesdropped during its transmission between the two receivers if the verification of the signature indicates that it is authentic and if the proportion of polarizations that do not correspond is lower than a given threshold, for example 1% if 450 different polarization pairs are used, or a multiple such as 2 of the probability of two pairs of different entangled photons being emitted at times that are indiscernible by the receivers.

In addition, one relative polarization of each of the pairs of polarizations of photons that were considered to be transmitting information I, if this relative polarization was verified as being different for each of the photons that reached each of the receivers, may be used to form a sequence of bits forming a randomly generated key known solely to each of the receivers; the receiver 3 that verified the concomitance of the relative polarizations will send, to the other receiver 4, a signed message, which is preferably signed using the random hash technique, and which is formed by the list of the reception dates of photons the relative polarizations of which did not correspond or the entangled photon of which was never received by the receiver 3.

Thus, in one example, the following steps are implemented.

Step 1

The receiver 4 receives, from the emitter 2, a flux of photons conveying information and establishes a first list of the reception dates of the photons that served to define this information, and the relative polarization designating that of the two complementary polarizations in which the photon was received.

Step 2

The receiver 4 forms a message consisting of the list of the information collected in the preceding step, creates an electronic signature of this list and transmits said list and the signature to the receiver 3.

Step 3

The receiver 3 receives the list and signature then verifies said signature.

Step 4

The receiver 3 makes a second list consisting of elements of the first list for which the relative polarizations of the photons received by the receivers 3 and 4 are the same or for which the entangled photon never reached the receiver 3, said receiver 3 having stored in a register the relative polarization of each photon that served to transmit information and its reception date. Knowing the difference in the time taken by the entangled photons to travel the path between the emitter 2 and each of the two receivers 3 and 4, i.e. path time, the receiver 3 may determine, for each photon of the first list, the relative polarization of the photon that it received at the reception date of the photon by the receiver 4 minus the path time. This second list is preferably made up of two separate parts, a first of these parts containing photons the entangled photon of which never reached the first receiver 3 and a second of these parts containing photons both entangled photons of which reached their respective receivers but with equal relative polarizations.

Step 5

If the number of elements of the second list restricted to pairs of entangled photons each of the two photons of which reached their respective receivers is lower than the product of a predetermined ratio multiplied by the count of the elements of the first list restricted to pairs of entangled photons each of the two photons of which reached their respective receivers, then the information is declared to have been transmitted without having been eavesdropped.

Step 6

If the information is declared to have been transmitted without having been eavesdropped, then the second list is sent signed by the receiver 3 to the receiver 4, then a third list is created by the receiver 3, this list consisting of the relative polarizations of the photons featuring in the first list but not featuring in the second list, i.e. regarding photons for which the relative polarizations were observed to be different.

In the contrary case, i.e. if the aforementioned product is higher than said threshold, a message indicating that the transmission is liable to have been eavesdropped is sent by the receiver 3 to the receiver 4.

Step 7

On reception of the second list by the receiver 4 and after verification of the signature, the third list is recreated in the receiver 4 using the first and second lists, then a signed message, confirming successful receipt of the second list, is sent by the receiver 4 to the receiver 3.

Step 8

The receiver 4 may use the third list as shared key with the receiver 3, and, on reception by the receiver 3 of the message transmitted in step 7, the receiver 3 may use the third list as shared key with the receiver 4.

In another example, the following method may be implemented to verify that a message of information I has not been eavesdropped.

The first receiver 3 may establish a first list comprising the reception dates at the first receiver and a second list comprising these reception dates and the polarization states of the photons absorbed by the first receiver 3, and the second receiver 4 may establish a third list comprising the reception dates at the second receiver 4 and a fourth list comprising these reception dates and the polarization states of the photons received by the second receiver, The first list and/or the third list may be exchanged between the first receiver 3 and the second receiver 4 and are preferably signed electronically.

Upon reception of the third and/or first lists, respectively, the first receiver 3 and/or the second receiver 4 may establish a fifth list comprising the dates at which the two photons of the same pairs were received at the first receiver 3, as some photons may have been lost during the transmission between the emitter and one or the two receivers.

If only one of the two receivers establishes the fifth list, the said fifth list may be transmitted, preferably electronically signed, to the other receiver, so that the first receiver 3 and the second receiver 4 may establish respectively a sixth list and a seventh list of polarization states of the photons as received by the first receiver, the sixth list being derived from the second list and the fifth list, the seventh list being derived from the fourth list and the fifth list, each relative polarization state on the sixth list of a photon received at the first receiver at a time marked on the fifth list being the same relative polarization state of the corresponding photon received at the same time and marked on the second list, each relative polarization state on the seventh list of a photon entangled to a photon received at the second receiver at a time marked on the fifth list being the complementary relative polarization state of the corresponding photon received after the additional travel time $t_{tra}$ and marked on the fourth list Then, respective signatures of the sixth list and the seventh list may be exchanged between the first and the second receivers according to the method corresponding to the third variant of the verifying method of the integrity of a message the first receiver 3 being the first apparatus, the sixth list being the first dataset, the second receiver 4 being the second apparatus and the seventh list being the second dataset.

FIG. 19 illustrates an example of a method to create electronic signatures of a set of data Sd. At step o, a set of data, for example composed of the bits of the relative polarisations of the entangled photons P1 or P2 received at the receivers 3 or 4, is created. At step i., a secret number R is concatenated to the set of data to form an amended set of data. At step ii., a Hash of the amended set of data is computed. And at step iii., the Hash is encrypted with a onetime key K, for example using an XOR operation.

The comparison of the hashes of said lists should give identical hashes to ensure that no list has been altered by a man in the middle attack, and that no photon has been lost in the transmission channel.

After such signatures have been received and verified, a signed message may be exchanged between the two receivers and the said sixth and seventh lists may be used as a shared list of random bits from which one-time keys or lists of random rotation angles of the polarization measurement bases, for instance, can be extracted.

In another example, illustrated in FIG. 17, a physical protection of the second propagation path D2 is used for a portion Ltot of the second propagation path D2 ending at the second receiver 4, where the photons P2 travel from the emitter 2 after their entangled photons P1 have been received by the first receiver 3. The portion Ltot corresponds to the sum of a smaller portion L of the portion Ltot and the additional travel path Ltra.

The portion Ltot is long enough so that the difference t between the travel time $t_{tot}$ of a photon P2 in the said portion Ltot and the travel time $t_{tra}$ of the photon P2 in the additional travel path Ltra may be detected and measured by a clock of the second receiver 4 and that such detection enables the second receiver 4 to mark any incoming message as being potentially eavesdropped by a third party.

This may avoid a hacking device placed at such non protected portion of the propagation path to eavesdrop and retransmit the photons traveling there not entangled anymore.

In another example, illustrated in FIG. 18, two polarization rotators 80 and 90 are placed ahead of the two photon receivers 3 and 4 respectively, the two photon rotators modifying the direction of polarization of the photons synchronously and randomly, for example by 45° or 0°, for example every photon or every second, so that a spy photon emitter may not know the polarization directions that are being measured by the receivers 3 and 4. The two receivers 3 and 4 may share a list of random bits where 0 represents a rotation by 0° and 1 a rotation by 45°.

This may avoid a known secret number being generated by a hacker replacing the entangled photons emitter by a photon emitter sending non entangled photon pairs representing a message that is also made to be sent by the first receiver.

The invention claimed is:

1. A method of transmitting a message by quantum communication from a first receiver to a second receiver with eavesdropping detection, method comprising:

(A) generating a series of $N_p$ pairs of entangled photons from an emitter, a first photon of each pair being emitted toward the first receiver on a first propagation path and a second photon of the pair being emitted simultaneously toward the second receiver on a second propagation path, the first and second photons being entangled, the second receiver being located on a propagation path of the second photon further away from the emitter than the first receiver, such that the second photon arrives at the second receiver after an additional travel time $t_{tra}$, (B) converting the message into a series of $N_i$ information I to be transmitted in a first predetermined numbering base, (C) at the first receiver, for each information I:

(a) for each entangled photon, modifying a polarization state of the first photon when it reaches the first receiver into a polarization state dependent on the information I to be transmitted, the polarization state being selected from among at least two different pairs of complementary absorption polarizations, and (b) by using an absorption instrument, absorbing the first photon in one of the two complementary polarizations of the selected pair, (D) at the second receiver:

(a) duplicating each received photon to form a flux of multiplied photons by using an amplification device, the light that is created having preserved the polarization state of the photon, (b) measuring, for each photon duplicated, the average polarization state of the light flux, and (c) determining according to this measurement the polarization state of the first entangled photon received by the first receiver, in order to deduce therefrom the information I that may have been transmitted by the first receiver, (d) add an element comprising the reception time of the second entangled photon and the determined polarization state of the first entangled photon that may have transmitted the information I, to a deduction list, the deduction list being a list comprising the reception times of the second entangled photons and the determined polarization states of the first entangled photons that may have transmitted the information I, (E) perform an eavesdropping detection method, (F) deduct from the deduction list the transmitted message, the eavesdropping detection method performed at step (E) comprising a shared quantum key generation method comprising:

(G) the first receiver establishing a first list comprising the reception dates at the first receiver and a second list comprising these reception dates and the relative polarization states of the photons absorbed by the first receiver, and the second receiver establishing a third list comprising the reception dates at the second receiver and a fourth list comprising these reception dates and the relative polarization states of the photons received by the second receiver, (H) the first list and/or the third list being exchanged between the first receiver and the second receiver, (I) upon reception of the third list and/or first list, respectively, the first receiver and/or the second receiver establishing a fifth list comprising the dates at which the first photons were received at the first receiver, for the pairs for which the two entangled photons were received at both receivers, as some photons may have been lost during the transmission between the emitter and one or the two receivers, (J) if only one of the two receivers establishes the fifth list, the said fifth list being transmitted, preferably electronically signed, to the other receiver, so that the first receiver and the second receiver establish respectively a sixth list and a seventh list of relative polarization states of the photons as received by the first receiver, the sixth list being derived from the second list and the fifth list, the seventh list being derived from the fourth list and the fifth list, each relative polarization state on the sixth list of a photon received at the first receiver at a time marked on the fifth list being the same relative polarization state of the corresponding photon received at the same time and marked on the second list, each relative polarization state on the seventh list of a photon entangled to a photon received at the second receiver at a time marked on the fifth list being the complementary relative polarization state of the polarization state of the corresponding photon received at the second receiver after the additional travel time $t_{tra}$ and marked on the fourth list, (K) respective signatures of the sixth list and the seventh list being exchanged between the first and the second receivers to be compared according to a comparison method, (L) if the signatures of the sixth list and the seventh list are identical, the deduction list of information I is considered non-eavesdropped.

2. The method according to claim 1, the relative polarization of a photon being the polarization of the photon, or a bit assigned to all the possible polarizations that can be taken by the second entangled photons after the first photon has hit the first receiver where 1 is the said assigned bit of a photon entangled to a photon to which a 0 has been assigned.

3. The method according to claim 1, wherein the comparison method in step comprises:

i. the first receiver mixing a first secret number, shared or to be shared with the second receiver, called mixer number, with the sixth list, using a mixing function, in order to obtain a first mixed data, ii. the first receiver hashing the first mixed data using a hash function, iii. the first receiver encrypting the hashing of the first mixed data with a second secret number shared or to be shared with the second receiver, iv. the first receiver sending to the second receiver, the encrypted hashing of the first mixed data with the second secret number, v. the second receiver receiving the data sent by the first receiver at step iv, vi. the second receiver decrypting the received data, vii. the second receiver mixing the first secret number with the seventh list, using a mixing function, in order to obtain a second mixed data, viii. the second receiver hashing the second mixed data using a hash function, ix. the second receiver comparing the hashing of the second mixed data with the decrypted received data.

4. The method according to claim 3, the first secret number being kept secret and used again or changed periodically such as each time or every day.

5. The method according to claim 3, the second secret number being kept secret and used again or changed periodically such as each time or every day.

6. The method according to claim 3, the first secret number being a first renewable key, renewed after each use, and/or the second secret number being a second renewable key, renewed after each use.

7. The method according to claim 3, the receivers sharing the secret numbers before step (K) takes place or after step (K) takes place and prior to their use, notably the receivers sharing the secret numbers by sending it to each other encrypted with a onetime key.

8. The method according to claim 3, a mixer number identifier may be exchanged between the first receiver and the second receiver, which are each able to find the corresponding mixer number in a memorized list of mixer numbers.

9. The method according to claim 3, the mixing function being an XOR logic function, or a suffix function, including adding the mixer number to the end of the sixth list, or an encrypting function using the mixer number as encryption key to encrypt the sixth list, or the mixing function being a combination of an XOR function, a suffix function including adding the mixer number to the end of the first dataset and an encryption function using the mixer number as encryption key to encrypt the first dataset, the encrypting function being for example an XOR function.

10. The method according to claim 3, a signed message being exchanged after step ix. between the two receivers before the sixth and seventh lists are used as one-time keys.

11. The method according to claim 3, the deduction list being considered as not having been eavesdropped if the two compared data at step ix. are equal.

12. The method according to claim 1, the lists established at step (G) being established for the transmission of a single information I or established using photons transmitted for the transmission of a series of multiple information.

13. The method according to claim 1, the second propagation path being physically protected against eavesdropping, at least for a portion of the second propagation path ending at the second receiver, where the photons travel from the emitter after their entangled photons have been received by the first receiver, the portion being long enough so that the difference t between the travel time of a photon in the said portion and the travel time of the photon in the non-entangled state towards the second receiver may be detected by the second receiver and that such detection enables the second receiver to mark any incoming message as being potentially eavesdropped by a third party.

14. The method according to claim 1, two polarization rotators being placed ahead of the two photon receivers respectively, the two photon rotators modifying the direction of polarization of the photons synchronously and randomly by 45° or 0° so that a spy photon emitter may not know the polarization directions that are being measured by the receivers.

15. The method according to claim 1, the sixth list and seventh list being made of bits, and potentially being used as a shared list of random bits.

16. The method according to claim 1, wherein the mixing function being an XOR logic function, or a suffix function, including adding the mixer number to the end of the sixth list, or an encrypting function using the mixer number as encryption key to encrypt the sixth list, or the mixing function being a combination of an XOR function, a suffix function including adding the mixer number to the end of the first dataset and an encryption function using the mixer number as encryption key to encrypt the first dataset, the encrypting function being for example an XOR function, and wherein the transmitted message being used as an encryption key if the deduction list has been considered as not having been eavesdropped.

17. The method according to claim 3, wherein the mixing function being an XOR logic function, or a suffix function, including adding the mixer number to the end of the sixth list, or an encrypting function using the mixer number as encryption key to encrypt the sixth list, or the mixing function being a combination of an XOR function, a suffix function including adding the mixer number to the end of the first dataset and an encryption function using the mixer number as encryption key to encrypt the first dataset, the encrypting function being for example an XOR function, and wherein the encryption keys generated during the transmission and detection method and/or made of the message, being used, if the deduction list has been considered non-eavesdropped, as first and/or second secret numbers.

18. The method according to claim 1, the first receiver coding the same information on many successive incoming photons, as some of their entangled photons may be lost before reaching the second receiver, and/or the first receiver reserving an information to be used to separate the sending of any other two information, notably if the such two other information I are the same, representing for instance a same letter.

19. The method according to claim 1, the step (F) including deducting from the deduction list the transmitted message M, being achieved by the first receiver having coded a separation letter between any two equal successive letters of the message, accounting for the travel time and the fifth list, taking out of the deduction list the polarizations of photons for which the first entangled photon never reached the first receiver to create a cleared deduction list, and the second receiver deducting from the cleared deduction list the message that was transmitted, or the second receiver counting as received information any information that is recorded successively on the deduction list more than a preset number of times within a preset number of successively received information.

20. The method according to claim 1, the message being considered as not having been eavesdropped if the deduction list has been considered as non-eavesdropped.

21. The method according to claim 1, the pair of complementary absorption polarizations being selected from among at least three different pairs of complementary absorption polarizations, notably from among at least two hundred and ten distinct pairs of complementary absorption polarizations.

22. The method according to claim 1, a plurality of pairs of entangled photons being generated successively by the emitter, each pair of photons making it possible to transmit an item of information from the first receiver to the second receiver.

23. A quantum communication system, comprising:

an emitter of entangled photons, comprising a source configured in order to generate at least one pair of entangled photons comprising a first photon emitted on a first propagation path and simultaneously a second photon emitted on a second propagation path different from the first propagation path, a first receiver arranged on the first propagation path, comprising a complex absorber configured to absorb the photon in a polarization state selected from among the states of at least two different pairs of complementary polarization states, a second receiver arranged on the second propagation path to be reached by the second photon after the first photon has reached the first receiver, said second receiver comprising:

an optical amplifier to multiply the second photon while preserving its polarization, and arranged downstream of the amplifier, a measuring instrument to measure the average polarization of the multiplied photons, wherein said first receiver transmit said message by quantum communication to a second receiver, with eavesdropping detection by employing each of steps (A) through (L) as claimed in claim 1.

24. The quantum communication system according to claim 23, the complex absorber being configured to absorb the photon in a predetermined polarization state selected from among the states of at least three different pairs of complementary polarizations.

25. The quantum communication system according to claim 23, the complex absorber comprising:

at least one instrument to absorb the photon in one or other of two complementary polarization states, a polarization modifier which is arranged upstream of said instrument and is configured to convert the polarization of the first photon to the selected polarization along which said instrument absorbs the photons.

26. The quantum communication system according to claim 25, the polarization modifier comprising a polarization direction modifier arranged upstream of a polarization phase modifier.

27. The quantum communication system according to claim 26, the polarization direction modifier comprising two quarter-wave plates arranged one after the other on the propagation path of the first photon, the orientation of at least one of the two plates being variable.

28. The quantum communication system according to claim 26, the polarization direction modifier comprising a plate or a prism made of chiral or rotating material inducing rotation of the polarization by an angle dependent on the location through which the wave enters said chiral or rotating material.

29. The quantum communication system according to claim 26, the polarization phase modifier comprising a birefringent first plate or prism splitting the beam into two electromagnetic waves with a linear polarization, one along a first axis and the other along a second axis, and a retardation plate with a variable refractive index arranged on the second axis.

30. The quantum communication system according to claim 25, said at least one instrument comprising at least one filter to send the first photon toward one or other of two photon detectors according to the polarization state of the first photon.

31. The quantum communication system according to claim 23, the measuring instrument of the second receiver comprising at least one photon detector arranged to measure the polarization of the light originating from the multiplication of the second photon.

32. The quantum communication system according to claim 23, the measuring instrument of the second receiver comprising a succession of semi reflective plates arranged downstream of the optical amplifier, said plates directing the flux of multiplied photons with an equal intensity toward a first phase measurement instrument being a polarization measuring instruments arranged in order to measure the intensity of the flux along two perpendicular axes, a second phase measurement instrument measuring the phase shift of the light between these two same axes, and a third phase measurement instrument measuring the phase shift of the light between light between the bisector of the same axes and an axis perpendicular to that bisector, the first semi reflective plate diverting for example a third of the light flux towards the first phase measurement instrument, the second semi-reflective plate diverting for example half of its incoming light flux towards the second phase measurement instrument and the remaining half of its incoming light flux towards the third phase measurement instrument.

33. The quantum communication system according to claim 23, the optical amplifier being a doped-fiber amplifier.

34. The quantum communication system according to claim 23, the emitter being configured to successively generate a plurality of pairs of entangled photons.

35. The quantum communication system according to claim 23, the emitter and each of the receivers comprising a clock, the clocks of the emitter and of the receivers being synchronized with one another.

36. The quantum communication system according to claim 23, the second receiver comprising a switch arranged in front of the optical amplifier and configured to absorb or reflect the photon or photons subsequent to a first photon reaching said second receiver in a predetermined time interval.

37. The quantum communication system according to claim 23, comprising a second emitter capable of generating one or more pairs of entangled photons, the second emitter being located closer to the second receiver than to the first receiver.

* * * * *